(12) United States Patent
Choi et al.

(10) Patent No.: US 12,548,884 B2
(45) Date of Patent: Feb. 10, 2026

(54) ANTENNA AND ELECTRONIC APPARATUS INCLUDING THE SAME

(71) Applicant: SAMSUNG ELECTRONICS CO., LTD., Suwon-si (KR)

(72) Inventors: Nakchung Choi, Suwon-si (KR); Himchan Yun, Suwon-si (KR); Shinho Yoon, Suwon-si (KR); Soonho Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 811 days.

(21) Appl. No.: 17/829,746

(22) Filed: Jun. 1, 2022

(65) Prior Publication Data
US 2022/0294099 A1 Sep. 15, 2022

Related U.S. Application Data

(63) Continuation of application No. PCT/KR2020/017466, filed on Dec. 2, 2020.

(30) Foreign Application Priority Data

Dec. 2, 2019 (KR) .................. 10-2019-0158322

(51) Int. Cl.
H01Q 1/00 (2006.01)
H01Q 1/24 (2006.01)
(Continued)

(52) U.S. Cl.
CPC ............ H01Q 1/243 (2013.01); H01Q 5/371 (2015.01); H04M 1/0216 (2013.01); H04M 1/0268 (2013.01)

(58) Field of Classification Search
CPC ........ H01Q 1/243; H01Q 5/371; H01Q 5/328; H01Q 9/42; H01Q 5/335; H01Q 5/364;
(Continued)

(56) References Cited

U.S. PATENT DOCUMENTS 8,725,213 B2 * 5/2014 Nakamura ............. H01Q 1/243
455/562.1
11,984,673 B2 * 5/2024 Koo ....................... H01Q 9/40
(Continued)

FOREIGN PATENT DOCUMENTS

KR 10-2011-0051086 5/2011
KR 10-2011-0123995 11/2011
(Continued)

OTHER PUBLICATIONS

Korean Office Action issued Nov. 19, 2023 in corresponding Korean Patent Application No. 10-2019-0158322.
(Continued)

Primary Examiner — Md K Talukder
(74) Attorney, Agent, or Firm — NIXON & VANDERHYE P.C.

(57) ABSTRACT

According to various embodiments, an electronic apparatus comprises: a housing comprising at least one conductive portion arranged through at least one non-conductive portion; a substrate arranged in an internal space of the housing and comprising a ground; a wireless communication circuit arranged on the substrate and capacitively coupled to a first point of the at least one conductive portion; the first point being located at a first electric distance from the at least one non-conductive portion, through a first electric path; and a variable circuit arranged on a second electric path branched from the first electric path and connected to the ground, wherein the at least one conductive portion is connected to the ground through a third electric path at a second point further from the at least one non-conductive portion than the first point, and the first electric distance may be shorter than a second electric distance from the first point to the second point.

14 Claims, 16 Drawing Sheets

(51) Int. Cl.
  *H01Q 5/371* (2015.01)
  *H04M 1/02* (2006.01)
(58) Field of Classification Search
  CPC ............. H04M 1/0216; H04M 1/0268; H04M
    1/0214; H04M 1/026; H04M 1/0266;
    H04B 1/00; H04B 1/006
  See application file for complete search history.

(56) References Cited

U.S. PATENT DOCUMENTS

| | | | |
|---|---|---|---|
| 2011/0275333 A1 | 11/2011 | Kim et al. | |
| 2016/0254590 A1 | 9/2016 | Seo et al. | |
| 2017/0047638 A1* | 2/2017 | Kim | H01Q 9/42 |
| 2018/0188432 A1* | 7/2018 | Choi | G02B 5/3058 |
| 2018/0351589 A1 | 12/2018 | Shin et al. | |
| 2018/0366812 A1* | 12/2018 | Kim | H01Q 1/44 |
| 2019/0020100 A1* | 1/2019 | Jong | H01Q 1/48 |
| 2019/0067821 A1* | 2/2019 | Kim | H01Q 1/243 |
| 2020/0119429 A1* | 4/2020 | Park | H01Q 1/38 |
| 2020/0287274 A1* | 9/2020 | Zhang | H04M 1/0214 |
| 2020/0295454 A1* | 9/2020 | Yun | H01Q 1/50 |
| 2020/0328501 A1* | 10/2020 | Kang | H01Q 5/335 |
| 2021/0328329 A1* | 10/2021 | Kim | H04M 1/0214 |
| 2022/0294099 A1* | 9/2022 | Choi | H04B 1/00 |
| 2023/0268669 A1* | 8/2023 | Park | H01Q 21/28 455/566 |

FOREIGN PATENT DOCUMENTS

| | | |
|---|---|---|
| KR | 10-1516418 | 5/2015 |
| KR | 10-2017-0056362 | 5/2017 |
| KR | 10-2017-0136292 | 12/2017 |
| KR | 10-1842627 | 3/2018 |
| KR | 10-2019-0022074 | 3/2019 |

OTHER PUBLICATIONS

International Search Report for PCT/KR2020/017466 mailed Mar. 9, 2021, 5 pages.
Written Opinion of the ISA for PCT/KR2020/017466 mailed Mar. 9, 2021, 5 pages.

* cited by examiner

ANTENNA AND ELECTRONIC APPARATUS INCLUDING THE SAME

CROSS-REFERENCE TO RELATED APPLICATIONS

This application is a continuation of International Application No. PCT/2020/017466 designating the United States, filed on Dec. 2, 2020, in the Korean Intellectual Property Receiving Office and claiming priority to Korean Patent Application No. 10-2019-0158322, filed on Dec. 2, 2019, in the Korean Intellectual Property Office, the disclosures of which are incorporated by reference herein in their entireties.

BACKGROUND

Field

The disclosure relates to an antenna and an electronic apparatus including the same.

Description of Related Art

Electronic apparatuses are gradually becoming slim to satisfy purchase demands of consumers as functional differences between respective manufacturers are substantially reduced, and have been developed to increase the rigidity of electronic apparatuses, to enhance design aspects thereof, and to differentiate functional elements thereof. In line with such trends, electronic apparatuses have been developed such that excellent radiation performance is exhibited through a structural change of at least one antenna, which needs to be provided for communication, among components thereof.

In connection with antennas used for an electronic apparatus, the volume and the number of mounted antennas may be determined according to the service-specific frequency, bandwidth, and type. For example, in respective global regions, a low band of about 700 MHz to 900 MHz, a mid band of about 1700 MHz to 2100 MHz, a high band of about 2300 MHz to 2700 MHz, or a high-frequency band of about 3 GHz to 100 GHz may be used as a main communication band. As another example, various wireless communication services such as BT (bluetooth), GPS (global positioning system), or WIFI (wireless fidelity) may be used. In order to support the above-mentioned communication bands, multiple antennas are necessary, but electronic apparatuses are required to become slimmer and thus may have limited antenna volume spaces. In order to overcome this, service bands having similar frequency bands may be grouped to separately design multiple antennas.

For example, based on European standards, a total of 24 bands, such as 2G (GSM850, EGSM, DCS, PCS), WCDMA (B1, B2, B5, B8), and LTE (B1, B2, B3, B4, B5, B7, B8, B12, B17, B18, B19, B20, B26, B38, B39, B40, B41), may be implemented in connection with antennas, but if all bands are implemented in a single antenna, it is difficult to satisfy the operator specification, to satisfy the SAR (specific absorption rate) standard, to minimize/reduce influences on human bodies, and the like, and service bands having similar frequency bands may be grouped across at least two areas, thereby implementing antennas. For example, 2G (GSM850, EGSM, DCS, PCS), WCDMA (B1, B2, B5, B8), and LTE (B1, B2, B3, B4, B5, B8, B12, B17, B18, B19, B20, B26, B39) may be implemented for an antenna, and an antenna of LTE (B7, B38, B40, B41) may be designed for another antenna.

The above-mentioned antenna may be electrically connecting a conductive structure or conductive pattern disposed on an electronic apparatus, and may be utilized as a multiband antenna operating in at least two different frequency bands. In such a case, the antenna may be designed to be optimized for a CA (carrier aggregation) (for example, 2CA, 3CA, or 4CA) or MIMO (multi input multi output) environment.

When a frequency shift is required with regard to each operator or region, an antenna operating in multiple bands may shift the frequency from a first frequency band to a second frequency band through a tuner or tunable IC (for example, frequency shifting circuit) disposed in an electric path connecting an antenna radiator and a wireless communication circuit. For example, the tunable IC may selectively switch elements having different values through a switch having a SOI (silcon on insulator) structure based on a FET (field effect transistor) module.

However, such a switching structure may degrade the antenna performance because, if an element is selected, the switching structure regarding the remaining elements is not fully turned off, and a leak current occurs. For example, the antenna may sensitively respond to a Coff value caused by such a leak current, and during a low-band switching, an undesired frequency shift may occur in the mid band and/or high band, thereby degrading radiation characteristics.

SUMMARY

Embodiments of the disclosure may provide an antenna and an electronic apparatus including the same.

Embodiments of the disclosure may provide an antenna capable of helping increase the radiation performance through a circuit-related structural change, and an electronic apparatus including the same.

Embodiments of the disclosure may provide an antenna capable of inducing a frequency shift only in a specific frequency band without substantial performance degradation, and an electronic apparatus including the same.

According to various example embodiments, an electronic apparatus may include: a housing including at least one conductive portion disposed through at least one non-conductive portion, a substrate disposed in the inner space of the housing and including a ground, a wireless communication circuit disposed on the substrate and capacitively coupled to a first point of the conductive portion positioned at a first electrical distance from the at least one non-conductive portion through a first electrical path, and a variable circuit branched from the first electrical path and disposed in a second electrical path connected to the ground, wherein the conductive portion is connected to the ground through a third electrical path at a second point further than the first point from the at least one non-conductive portion, and the first electrical distance is shorter than a second electrical distance from the first point to the second point.

According to various example embodiments, an electronic apparatus may include: a housing including a conductive hinge module comprising a hinge, a first housing connected to the hinge module and including a first surface, a second surface facing a direction opposite to the first surface, and a first conductive side portion surrounding a first space between the first surface and the second surface, a second housing connected to the hinge module and including a third surface, a fourth surface facing a direction opposite to the third surface, and a second conductive side portion surrounding a second space between the third surface and the fourth surface, at least one conductive portion disposed through at least one non-conductive portion spaced apart from one another in at least one side portion of the first conductive side portion and/or the second conductive side portion, the first housing and the second housing being arranged to be foldable along the hinge module such that in an unfolded state, the first surface and the third surface face a viewing direction, and in a folded state, the second surface and the fourth surface face opposite directions, a display disposed to cross from at least a part of the first surface to at least a part of the third surface through the hinge module, a substrate disposed in the first space and/or the second space and including a ground, a wireless communication circuit disposed on the substrate and capacitively coupled to a first point of the conductive portion positioned at a first distance from the at least one non-conductive portion through a first electrical path, and a variable circuit branched from the first electrical path and disposed in a second electrical path connected to the ground, wherein the conductive portion is connected to the ground through a third electrical path at the second point further than the first point from the first non-conductive portion, and the first distance is shorter than a second distance from the first point to the second point.

According to various example embodiments, indirect feeding may be applied between a wireless communication circuit and an antenna such that, when a frequency shift occurs in a first frequency band (for example, low band), no frequency in a second frequency band (for example, mid band and/or high band) is changed, thereby helping improve the antenna radiation performance.

BRIEF DESCRIPTION OF THE DRAWINGS

In connection with the description of the drawings, same or similar reference numerals will be used to refer to same or similar elements. Further, the above and other aspects, features and advantages of certain embodiments of the present disclosure will be more apparent from the following detailed description, taken in conjunction with the accompanying drawings, in which.

DETAILED DESCRIPTION

Figure 1:
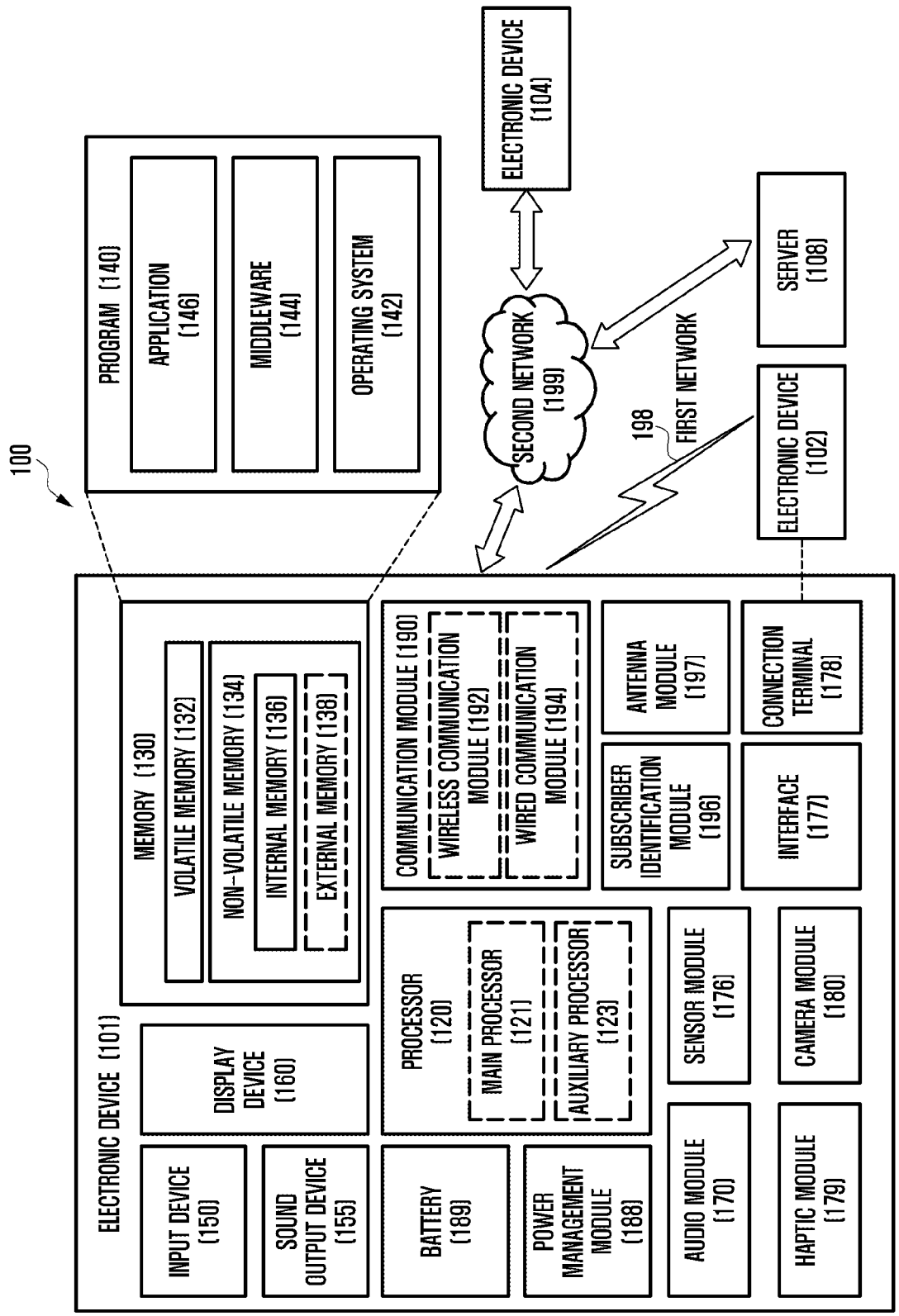
FIG. 1 is a block diagram illustrating an example electronic apparatus in a network environment according to various embodiments.

FIG. 1 is a block diagram illustrating an example electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identity module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, a home appliance, or the like. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

The term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2A:
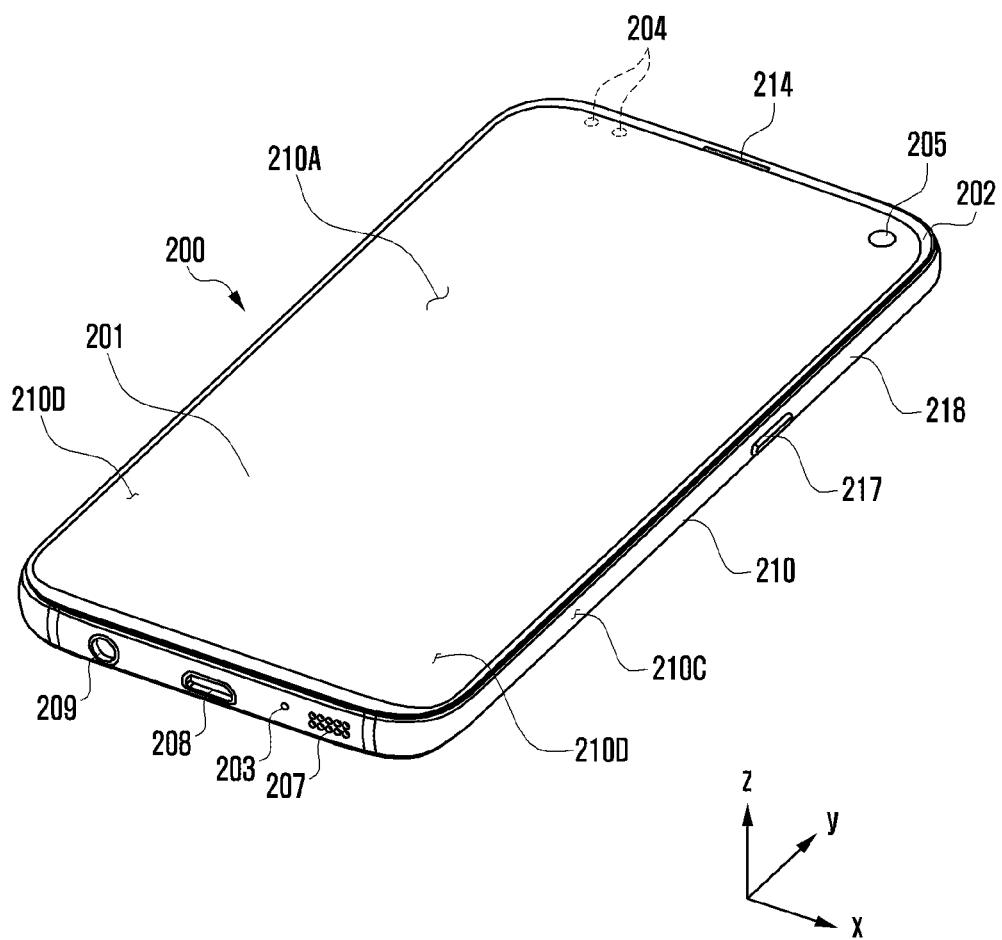
FIG. 2A is a front perspective view of an electronic apparatus according to various embodiments.
Figure 2B:
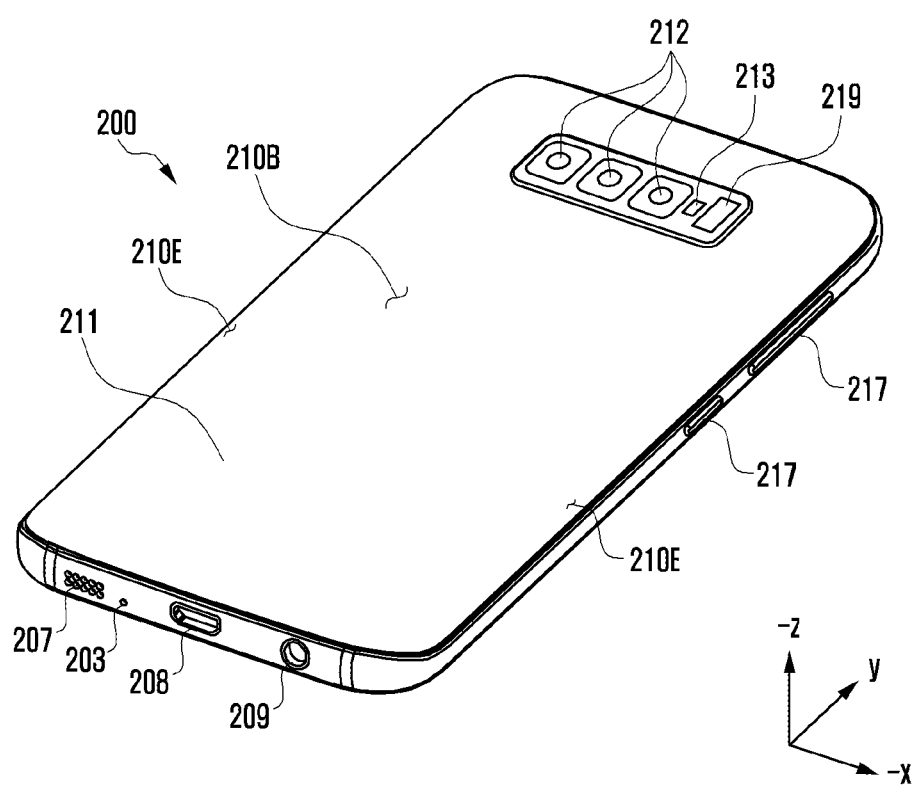
FIG. 2B is a rear perspective view of an electronic apparatus according to various embodiments.

FIG. 2A is a front perspective view of a mobile electronic device according to various embodiments. FIG. 2B is a rear perspective view of the electronic device of FIG. 2A according to various embodiments.

An electronic apparatus 200 of FIG. 2A and FIG. 2B may be at least partially similar to the electronic apparatus 101 of FIG. 1 or may further include other embodiments of an electronic apparatus.

Referring to FIGS. 2A and 2B, according to an embodiment, an electronic device 200 may include a housing 210 that includes a first surface (or front surface) 210A, a second surface (or rear surface) 210B, and a lateral surface 210C that surrounds a space between the first surface 210A and the second surface 210B. According to an embodiment, the housing 210 may refer to a structure that forms a part of the first surface 210A, the second surface 210B, and the lateral surface 210C. According to an embodiment, the first surface 210A may be formed of a front plate 202 (e.g., a glass plate or polymer plate coated with a variety of coating layers) at least a part of which is substantially transparent. The second surface 210B may be formed of a rear plate 211 which is substantially opaque. The rear plate 211 may be formed of, for example, coated or colored glass, ceramic, polymer, metal (e.g., aluminum, stainless steel (STS), or magnesium), or any combination thereof. The lateral surface 210C may be formed of a lateral bezel structure (or "lateral member") 218 which is combined with the front plate 202 and the rear plate 211 and includes a metal and/or polymer. The rear plate 211 and the lateral bezel structure 218 may be integrally formed and may be of the same material (e.g., a metallic material such as aluminum).

In the shown embodiment, the front plate 202 may include two first regions 210D disposed at long edges thereof, respectively, and bent and extended seamlessly from the first surface 210A toward the rear plate 211. In the shown embodiment, the rear plate 211 may include two second regions 210E disposed at long edges thereof, respectively, and bent and extended seamlessly from the second surface 210B toward the front plate 202 (refer to FIG. 2B). In various embodiments, the front plate 202 (or the rear plate 211) may include only one of the first regions 210D (or of the second regions 210E). In various embodiments, the first regions 210D or the second regions 210E may be omitted in part. In the embodiments, when viewed from a lateral side of the electronic device 200, the lateral bezel structure 218 may have a first thickness (or width) on a lateral side where one of the first regions 210D or one of the second regions 210E is not included, and may have a second thickness, being less than the first thickness, on another lateral side where one of the first regions 210D or one of the second regions 210E is included.

According to an embodiment, the electronic device 200 may include at least one of a display 201, audio modules 203, 207 and 214, sensor modules 204, 216 and 219, camera modules 205, 212 and 213, key input devices 217, a light emitting device 206, and connector holes 208 and 209. In various embodiments, the electronic device 200 may omit at least one (e.g., the key input devices 217 or the light emitting device 206) of the above components, or may further include other components.

The display 201 may be visible through a substantial portion of the front plate 202, for example. In various embodiments, at least a part of the display 201 may be visible through the front plate 202 that forms the first surface 210A and the first regions 210D. In various embodiments, outlines (e.g., edges and corners) of the display 201 may have substantially the same form as those of the front plate 202. In an embodiment (not shown), the spacing between the outline of the display 201 and the outline of the front plate 202 may be substantially unchanged in order to enlarge the visible area of the display 201.

The audio modules 203, 207 and 214 may correspond to a microphone hole (e.g., the audio module 203) and speaker holes (e.g., the audio modules 207 and 214). The microphone hole may contain a microphone disposed therein for acquiring external sounds and, in a case, contain a plurality of microphones to sense a sound direction. The speaker holes may be classified into an external speaker hole and a call receiver hole. In various embodiments, the microphone hole and the speaker holes may be implemented as a single hole, or a speaker (e.g., a piezo speaker) may be provided without the speaker holes.

The sensor modules 204, 216 and 219 may generate electrical signals or data corresponding to an internal operating state of the electronic device 200 or to an external environmental condition. The sensor modules 204, 216 and 219 may include a first sensor module (e.g., the sensor module 204) (e.g., a proximity sensor) and/or a second sensor module (e.g., a fingerprint sensor) disposed on the first surface 210A of the housing 210, and/or a third sensor module (e.g., the sensor module 219) (e.g., a heart rate monitor (HRM) sensor) and/or a fourth sensor module (e.g., the sensor module 216) (e.g., a fingerprint sensor) disposed on the second surface 210B of the housing 210. The fingerprint sensor may be disposed on the second surface 210B as well as the first surface 210A (e.g., the display 201) of the housing 210. The electronic device 200 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 205, 212 and 213 may include a first camera device (e.g., the camera module 205) disposed on the first surface 210A of the electronic device 200, and a second camera device (e.g., the camera module 212) and/or a flash (e.g., the camera module 213) disposed on the second surface 210B. The camera module 205 or the camera module 212 may include one or more lenses, an image sensor, and/or an image signal processor. The flash may include, for example, a light emitting diode or a xenon lamp. In various embodiments, two or more lenses (infrared cameras, wide angle and telephoto lenses) and image sensors may be disposed on one side of the electronic device 200.

The key input devices 217 may be disposed on the lateral surface 210C of the housing 210. In an embodiment, the electronic device 200 may not include some or all of the key input devices 217 described above, and the key input devices 217 which are not included may be implemented in another form such as a soft key on the display 201. In various embodiments, the key input devices 217 may include the sensor module 216 disposed on the second surface 210B of the housing 210.

The light emitting device may be disposed on the first surface 210A of the housing 210, for example. For example, the light emitting device 206 may provide status information of the electronic device 200 in an optical form. In various embodiments, the light emitting device 206 may provide a light source associated with the operation of the camera module 205. The light emitting device 206 may include, for example, a light emitting diode (LED), an infrared (IR) LED, or a xenon lamp.

The connector holes 208 and 209 may include a first connector hole (e.g., the connector hole 208) adapted for a connector (e.g., a universal serial bus (USB) connector) for transmitting and receiving power and/or data to and from an external electronic device, and/or a second connector hole (e.g., the connector hole 209) adapted for a connector (e.g., an earphone jack) for transmitting and receiving an audio signal to and from an external electronic device.

Some modules 305 of camera modules 305 and 312, some sensor modules 304 of sensor modules 304 and 319, or an indicator may be arranged to be exposed through a display 301. For example, the camera module 305, the sensor module 304, or the indicator may be arranged in the internal space of an electronic device 300 so as to be brought into contact with an external environment through an opening of the display 301, which is perforated up to a front plate 302. In an embodiment, some sensor modules 304 may be arranged to perform their functions without being visually exposed through the front plate 302 in the internal space of the electronic device. For example, in this case, an area of the display 301 facing the sensor module may not require a perforated opening.

Figure 3:
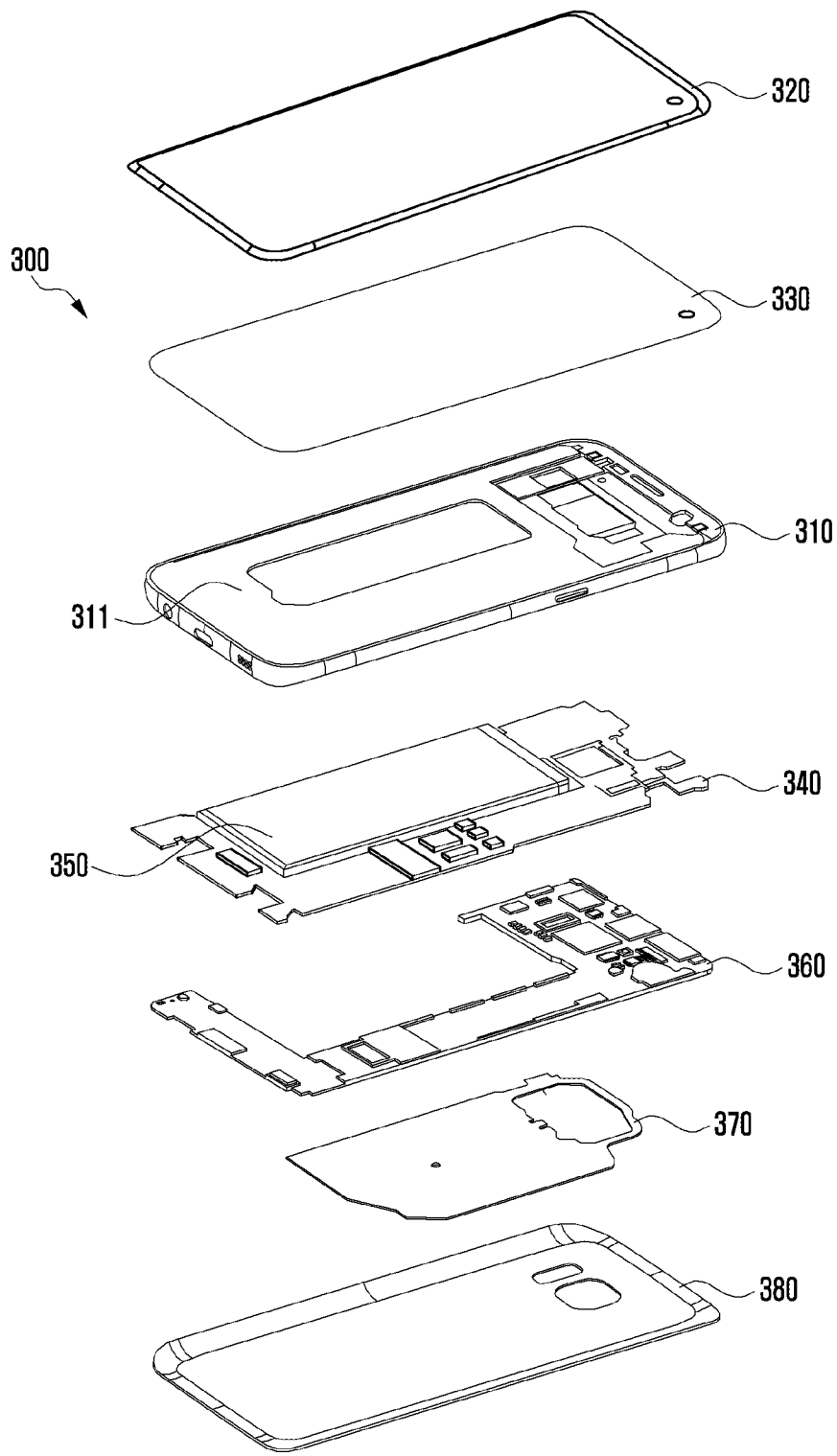
FIG. 3 is an exploded perspective view of an electronic apparatus according to various embodiments.

FIG. 3 is an exploded perspective view illustrating the electronic device of FIG. 2A according to various embodiments.

An electronic apparatus 300 of FIG. 3 may be at least partially similar to the electronic apparatus 101 of FIG. 1 or the electronic apparatus 200 of FIG. 2A may further include other embodiments of an electronic apparatus.

Referring to FIG. 3, an electronic device 300 (e.g., the electronic device 200 of FIG. 2A) may include a lateral bezel structure 310, a first support member 311 (e.g., a bracket), a front plate 320, a display 330 (e.g., the display 201), a printed circuit board (PCB) 340, a battery 350, a second support member 360 (e.g., a rear case), an antenna 370, and a rear plate 380. In various embodiments, the electronic device 300 may omit at least one (e.g., the first support member 311 or the second support member 360) of the above components or may further include another component. Some components of the electronic device 300 may be the same as or similar to those of the electronic device 100 shown in FIG. 2A or FIG. 2B, thus, descriptions thereof are omitted below.

The first support member 311 is disposed inside the electronic device 300 and may be connected to, or integrated with, the lateral bezel structure 310. The first support member 311 may be formed of, for example, a metallic material and/or a non-metal (e.g., polymer) material. The first support member 311 may be combined with the display 330 at one side thereof and also combined with the PCB 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, volatile memory or non-volatile memory.

The interface may include, for example, a high definition multimedia interface (HDMI), a USB interface, a secure digital (SD) card interface, and/or an audio interface. The interface may electrically or physically connect the electronic device 300 with an external electronic device and may include a USB connector, an SD card/multimedia card (MMC) connector, or an audio connector.

The battery 350 is a device for supplying power to at least one component of the electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the electronic device 300, and may be detachably disposed from the electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 310 and/or the first support member 311.

Figure 4:
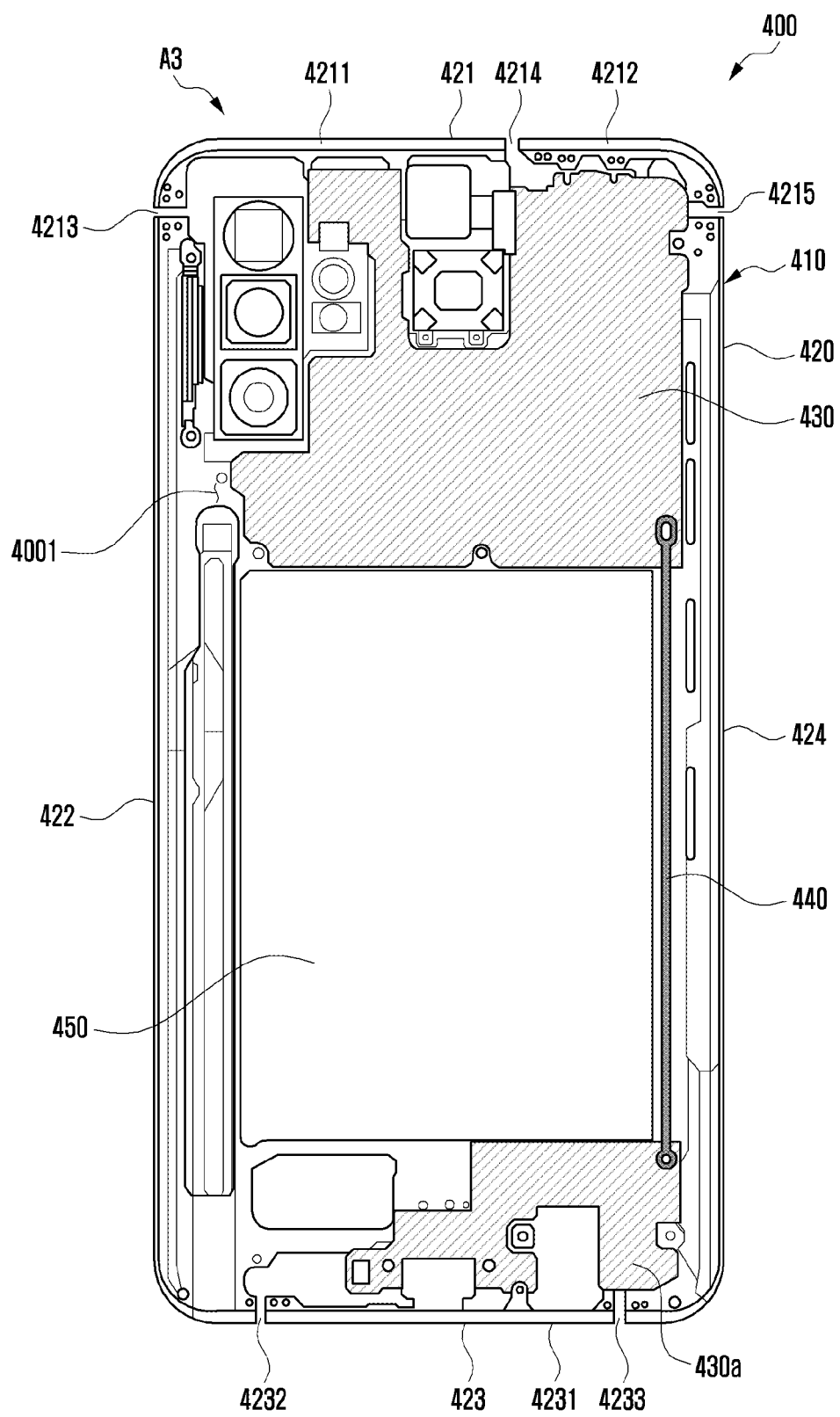
FIG. 4 is a diagram illustrating an example configuration of an electronic apparatus including an antenna according to various embodiments.

FIG. 4 is a diagram illustrating an example configuration of an electronic apparatus including an antenna according to various embodiments.

An electronic apparatus 400 of FIG. 4 may be at least partially similar to the electronic apparatus 101 of FIG. 1, the electronic apparatus 200 of FIG. 2A, or the electronic apparatus 300 of FIG. 3, or may further include other embodiments of an electronic apparatus.

Referring to FIG. 4, the electronic apparatus 400 may include a front cover (e.g., the front plate 202 of FIG. 2A), a rear cover (e.g., the rear plate 211 of FIG. 2B) configured to face a direction opposite to the front cover, and a housing 410 including a side member 420 configured to surround an inner space 4001 between the front cover and the rear cover. According to an embodiment, the side member 420 may at least partially include a conductive member (or portion).

According to various embodiments, the side member 420 may include a first side surface 421 having a first length, a second side surface 422 which is configured to extend from the first side surface 421 in a direction perpendicular to the first side surface and has a second length longer than the first length, a third side surface 423 which is configured to extend from the second side surface 422 in a direction parallel to the first side surface 421 and has a first length, and a fourth side surface 424 which is configured to extend from the third side surface 423 in a direction parallel to the second side surface 422 and has the second length.

According to various embodiments, the electronic apparatus 400 may include a printed circuit board 430 (e.g., a substrate or a main board) disposed in the inner space 4001 and a sub-board 430a disposed to be spaced apart from the printed circuit board 430. According to an embodiment, the printed circuit board 430 may include at least one wireless communication circuit (e.g., the wireless communication module 192 of FIG. 1). According to various embodiments, the electronic apparatus 400 may include a battery 450 disposed between the printed circuit board 430 and the sub-board 430a. According to an embodiment, the battery 450 may be disposed so as not to overlap the printed circuit board 430 and/or the sub-board 430a. As an embodiment, the battery 450 may be disposed to at least partially overlap the printed circuit board 430 and/or the sub-board 430a. According to an embodiment, the printed circuit board 430 may be electrically connected to the sub-board 430a through an electrical connection member 440. According to an embodiment, the electrical connection member 440 may include an RF coaxial cable or a flexible printed circuit board (FPCB) type RF cable (FRC).

According to various embodiments, the side member 420, which is formed of a conductive material, may include at least one conductive portion 4211, 4212, 4231 electrically separated by at least one non-conductive portion 4213, 4214, 4215, 4232, and 4233. According to an embodiment, the electronic apparatus 400, in the upper area thereof, may include two unit conductive portions 4211 and 4212 through which three spaced non-conductive portions 4213, 4214, and 4215 are arranged. For example, the electronic apparatus 400 may include a first conductive portion 4211 through which a first non-conductive portion 4213 formed at at least a part of the second side surface 422 and a second non-conductive portion 4214 formed at at least a part of the first side surface 421 are arranged. According to an embodiment, the electronic apparatus 400 may include a second conductive portion 4212 through which the second non-conductive portion 4214 and a third non-conductive portion 4215 formed at at least a part of the fourth side surface 424 are arranged and which is disposed to be adjacent to the first conductive portion 4211. According to an embodiment, the electronic apparatus 400, in the lower area thereof, may include a third conductive portion 4231 through which a third non-conductive portion 4232 and a fourth non-conductive portion 4233, which are arranged at at least parts of the third side surface 423 to be spaced apart from each other, are arranged.

According to various embodiments, the first conductive portion 4211 may be electrically connected to a wireless communication circuit (e.g., the wireless communication module 192 in FIG. 1) disposed on the printed circuit board 430 of the electronic apparatus 400 to operate as an antenna radiator. According to an example embodiment of the disclosure, the first conductive portion 4211 may be indirectly fed (capacitively coupled) through a wireless communication circuit (e.g., wireless communication module 192 of FIG. 1) to operate as a multi-band antenna radiator. For example, the wireless communication circuit (e.g., the wireless communication module 192 of FIG. 1) may be configured to transmit and/or receive wireless signals in different frequency bands through the first conductive portion 4211. According to an embodiment, the second conductive portion 4212 and the third conductive portion 4231 also may be electrically connected to the wireless communication circuit (e.g., the wireless communication module 192 of FIG. 1) to be used as an antenna radiator operating in various frequency bands. For example, multiple antenna radiators 4211, 4212, and 4231 may be electrically connected to a wireless communication circuit (e.g., the wireless communication module 192 of FIG. 1), and may be designed to operate in different frequency bands, or to operate in a carrier aggregation (CA), a multi-input multi-output (MIMO), or a diversity environment. As an embodiment, the electronic apparatus 400 may have more conductive portions arranged therein by more non-conductive portions electrically separated according to a design change, and thus may include more antennas configured to operate in various bands.

Figure 5:
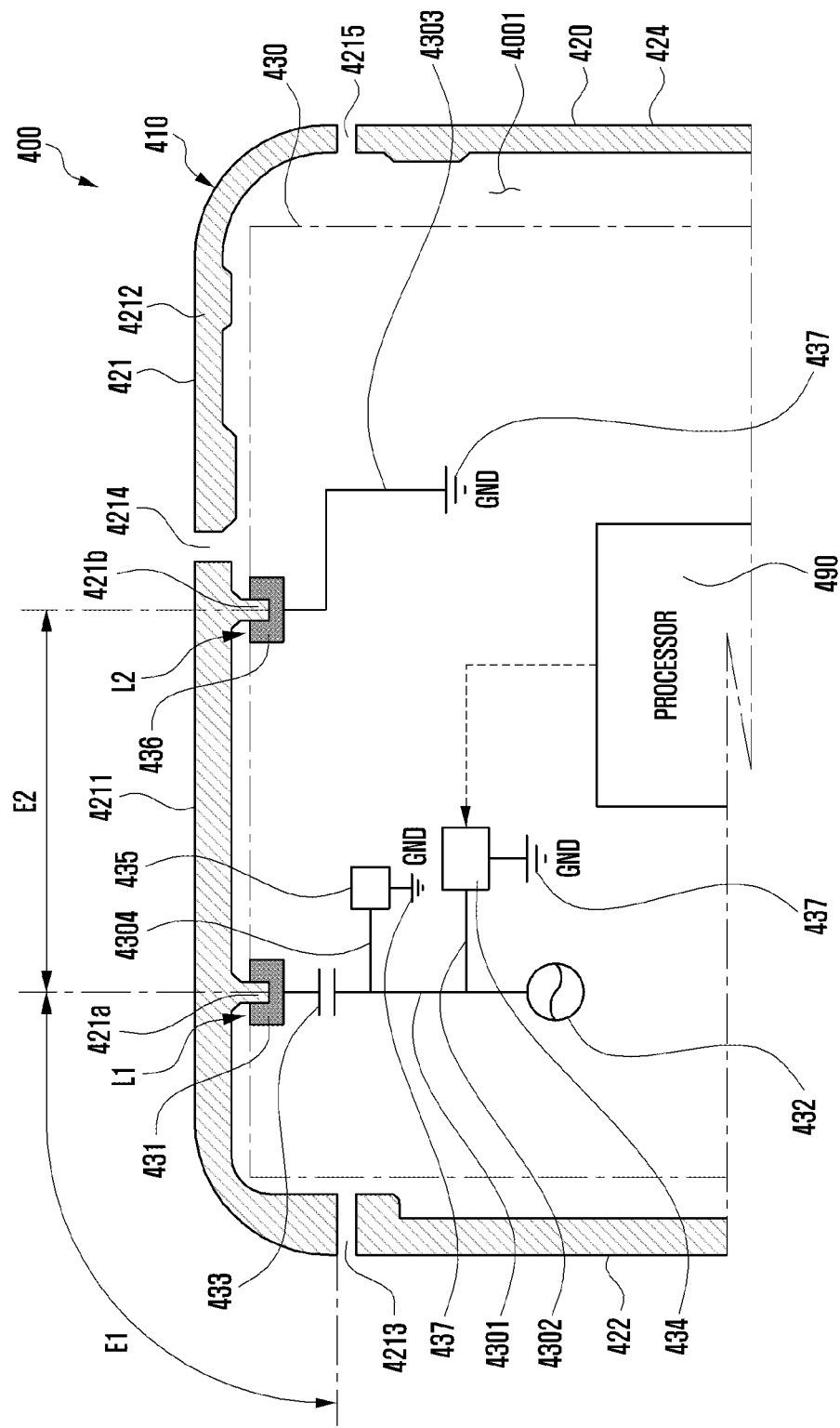
FIG. 5 is a diagram illustrating a partial view of an electronic apparatus, showing an antenna arrangement structure according to various embodiments.

FIG. 5 is a diagram illustrating a partial view of an electronic apparatus 400, showing an antenna arrangement structure according to various embodiments.

Hereinafter, an embodiment, in which the first conductive portion 4211 (hereinafter, referred to as a "conductive portion") is electrically connected to the wireless communication circuit 432 (e.g., the wireless communication module 192 of FIG. 1) and is used as an antenna, will be illustrated and described. However, it may be apparent that the above-described second conductive portion 4212 and/or third conductive portion 4231 also may be used as an antenna radiator in substantially the same manner.

Referring to FIG. 5, the electronic apparatus 400 may include the side member 420 including the conductive portion 4211 disposed to be electrically separated by the spaced non-conductive portions 4213 and 4214. According to an embodiment, the non-conductive portions 4213 and 4214 may include a first non-conductive portion 4213 formed at at least a part of the second side surface 422 and a second non-conductive portion 4214 formed at at least a part of the first side surface 421. As an embodiment, the first non-conductive portion 4213 and the second non-conductive portion 4214 may be arranged to be spaced apart from each other on the same side surface (e.g., a first side surface or a second side surface).

According to various embodiments, the side member 420 may include a first connection piece 421a formed at a first point L1 of the conductive portion 4211, which has a first electrical length E1 from the first non-conductive portion 4213. According to an embodiment, the side member 420 may include a second connection piece 421b formed at a second point L2 of the conductive portion 4211, which has a second electrical length E2 from the first point L1. According to an embodiment, the first point L1 may be disposed to be closer to the first non-conductive portion 4213 than the second point L2. According to an embodiment, the first electrical length E1 may be formed to be shorter than the second electrical length E2 by the arrangement of the first connection piece 421a and the second connection piece 421b. According to an embodiment, the first connection piece 421a and the second connection piece 421b may be integrally formed with the conductive portion 4211. According to an embodiment, the first connection piece 421a and the second connection piece 421b may be arranged to overlap at least a part of the printed circuit board 430 disposed in the inner space 4001 of the electronic apparatus 400.

According to various embodiments, the electronic apparatus 400 may include the printed circuit board 430 disposed in the inner space 4001 of the electronic apparatus 400. According to an embodiment, the printed circuit board 430 may include a first connection part 431 (e.g., a conductive pad) electrically connected to the first connection piece 421a. According to an embodiment, the printed circuit board 430 may include a second connection part 436 (e.g., a conductive pad) electrically connected to the second connection piece 421b. According to an embodiment, the first connection piece 421a and the second connection piece 421b may be physically and electrically connected to the first connection part 431 and the second connection part 436, only by a structure in which the printed circuit board 430 is disposed in the inner space 4001 of the electronic apparatus 400. As an embodiment, the first connection piece 421a and the second connection piece 421b may be electrically connected to the first connection part 431 and the second connection part 436 of the printed circuit board 430, by an electrical connection member such as a C-clip or a conductive tape.

According to various embodiments, the first connection part 431 may be electrically connected to the wireless communication circuit 432 (e.g., the wireless communication module 192 of FIG. 1) through a first electrical path 4301 (e.g., a wiring line) formed on the printed circuit board 430. According to an embodiment, the first connection piece 421a may be indirectly fed with the wireless communication circuit 432 by means of a capacitor 433 positioned in the first electrical path 4301. As an embodiment, the first connection piece 421a may be electrically connected to the first connection part 431 such that the first connection piece 421a can be coupled to the first connection part 431 through a structure spaced apart from the first connection part 431 without the capacitor 433. According to an embodiment, the electronic apparatus 400 may include a second electrical path 4302 branched from the first electrical path 4301 and electrically connected to the ground 437, in the printed circuit board 430. According to an embodiment, a variable circuit 434 (e.g., a tunable IC) may be disposed in the second electrical path 4302. According to an embodiment, the variable circuit 434 may be controlled by a processor 490 (e.g., the processor 120 of FIG. 1) of the electronic apparatus 400. According to an embodiment, the second electrical path 4302 may be branched between the capacitor 433 and the wireless communication circuit 432 of the first electrical path 4301. According to an embodiment, the second electrical path 4302 may be branched to be disposed between the first electrical path 4301 and the third electrical path 4303.

According to an embodiment, the second connection part 436 may be electrically connected to the ground 437 of the printed circuit board 430 through the third electrical path 4303, in the printed circuit board 430. According to an embodiment, the electronic apparatus 400 may include a fourth electrical path 4304 branched from the first electrical path 4301 and connected to the ground 437. According to an embodiment, at least one passive element 435 for electrostatic discharge (ESD) may be disposed in the fourth electrical path 4304. According to an embodiment, the fourth electrical path 4304 may be branched between the capacitor 433 of the first electrical path 4301 and a point at which the second electrical path 4302 is connected. According to an embodiment, the passive element 435 for ESD may include at least one inductor and/or capacitor. As an embodiment, the fourth electrical path 4304 and/or the at least one passive element 435 may be omitted.

According to various embodiments, the wireless communication circuit 432 may be configured to transmit and/or receive a wireless signal in a first frequency band and a second frequency band different from the first frequency band, through the conductive portion 4211. For example, the first frequency band may include a low-band (e.g., a frequency band in the range of about 700 MHz-900 MHz). According to an embodiment, the second frequency band may include a mid-band (e.g., a frequency band in the range of about 1700 MHz-2100 MHz) and/or a high-band (e.g., a frequency band in the range of about 2300 MHz-2700 MHz).

According to various embodiments, the wireless communication circuit 432 may be configured to transmit and/or receive a wireless signal in a first frequency band using the ground 437, the third electrical path 4303, the second connection piece 421*b*, and a part (e.g., the first electrical length E1+the second electrical length E2) of the conductive portion 4211, by indirect feeding with the conductive portion 4211 through the capacitor 433. According to an embodiment, the wireless communication circuit 432 may be configured to transmit and/or receive a wireless signal in the second frequency band using the first electrical path 4301, the first connection piece 421*a*, and the first electrical length E1 of the conductive portion 4211, by indirect feeding with the conductive portion 4211 through the capacitor 433. According to an embodiment, the capacitor 433, through the first electrical path 4301, may have a capacitance value which allows only a wireless signal of a mid-band and/or a high-band to pass therethrough. According to an embodiment, the capacitor 433 may have a capacitance value in the range of about 0.5 pF-1.5 pF, so that only a mid-band and/or a high-band is selectively received and thus it helps to prevent and/or reduce electric shock through the conductive portion.

According to various embodiments, for example, the processor 490 may be configured to control the variable circuit 434 in order to shift the first frequency band according to a change in a communication environment such as a change of service provider and a change of service area of the electronic apparatus 400, or the holding (e.g., the hand phantom) of the electronic apparatus. In this case, the second frequency band may not be substantially changed although the first frequency band through the variable circuit 434 is shifted by the capacitor disposed through the first electrical path 4301.

Figure 6:
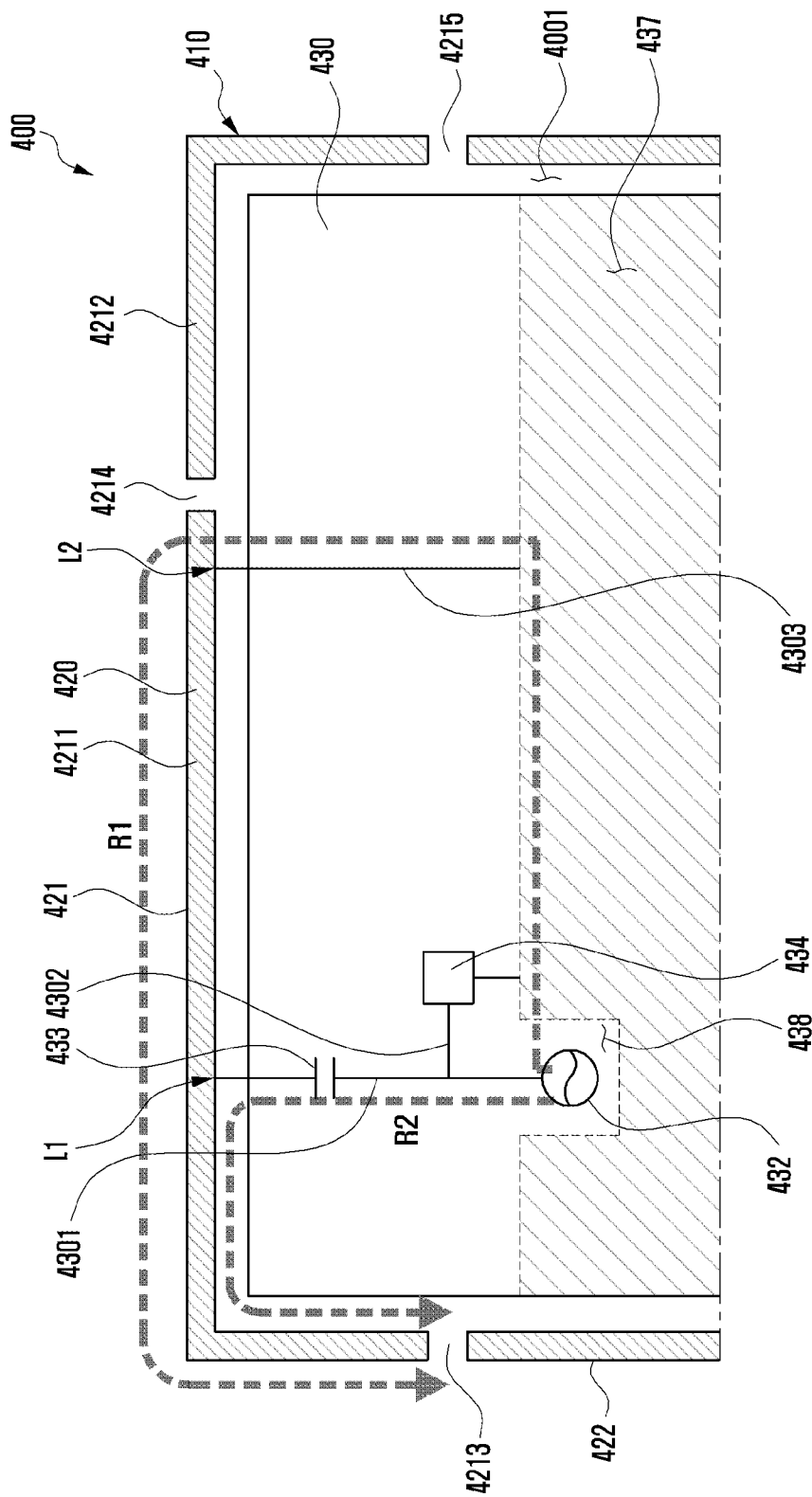
FIG. 6 is a diagram illustrating a partial view of an electronic apparatus, schematically showing a radiating path of an antenna according to various embodiments.

FIG. 6 is a diagram illustrating a partial view of an electronic apparatus, schematically showing a radiating path of an antenna according to various embodiments.

Referring to FIG. 6, the electronic apparatus 400 may include the printed circuit board 430 which is disposed in the inner space 4001 and includes the wireless communication circuit 432. According to an embodiment, the electronic apparatus 400 may include a conductive side member 420 including a conductive portion 4211 electrically separated by two non-conductive portions 4213 and 4214. According to an embodiment, the conductive portion 4211 may be electrically connected to the wireless communication circuit 432 disposed through a fill-cut area 438 of the printed circuit board 430 through the first electrical path 4301. According to an embodiment, the electronic apparatus 400 may include the capacitor 433 disposed in the first electrical path 4301. According to an embodiment, the electronic apparatus 400 may include the second electrical path 4302 which is branched from the first electrical path 4301 and electrically connected to the ground 437 of the printed circuit board 430. According to an embodiment, the second electrical path 4302 may be branched from the first electrical path 4301 between the capacitor 433 and the wireless communication circuit 432. According to an embodiment, the variable circuit 434 may be disposed in the second electrical path 4302. According to an embodiment, the conductive portion 4211 may be electrically connected to the ground 437 of the printed circuit board 430 through the third electrical path 4303 at a point (e.g., the second point L2) which is further than a point (e.g., the first point L1) at which the first electrical path 4301 is connected from the first non-conductive portion 4213.

According to various embodiments, the wireless communication circuit 432 may be configured to transmit and/or receive a wireless signal in a first frequency band (e.g., a low-band) using a first radiating path R1 through the ground area 437, the third electrical path 4303, and a part (e.g., the portion from a point, at which the third electrical path 4303 is connected, to the first non-conductive portion 4213) of the conductive portion 4211, by a structure indirectly fed to the conductive portion 4211 through the capacitor 433. According to an embodiment, the wireless communication circuit 432 may be configured to transmit and/or receive a wireless signal in a second frequency band (e.g., a mid-band and/or a high-band) using a second radiating path R2 through the first electrical path 4301 and a part (e.g., the portion from a point, at which the first electrical path 4301 is connected, to the first non-conductive portion 4213) of the conductive portion 4211.

According to various embodiments, the wireless communication circuit 432 may be configured to shift the resonant frequency of the first frequency band through control of the variable circuit 434 by a processor (e.g., the processor 490 of FIG. 5). In this case, the second frequency band through the second radiating path R2, which is indirectly fed through the capacitor 433, may not be substantially changed, and thus degradation of antenna radiation performance can be prevented and/or reduced. According to an embodiment, the wireless communication circuit 432 may be configured to shift the resonant frequency of the first frequency band in a first variable frequency range through control of the variable circuit 434 by a processor (e.g., the processor 490 of FIG. 5). According to an embodiment, the first variable frequency range may include a frequency range of 50 Mhz-100 Mhz. For example, the variable circuit 434 may affect the channel shift in an operating frequency band (e.g., the first frequency band) of an antenna through control of a processor (e.g., the processor 490 of FIG. 5). As an embodiment, the variable circuit 434 may also affect the channel shift in an operating frequency band (e.g., the first frequency band) of an antenna through control of the wireless communication circuit 432.

Figure 7:
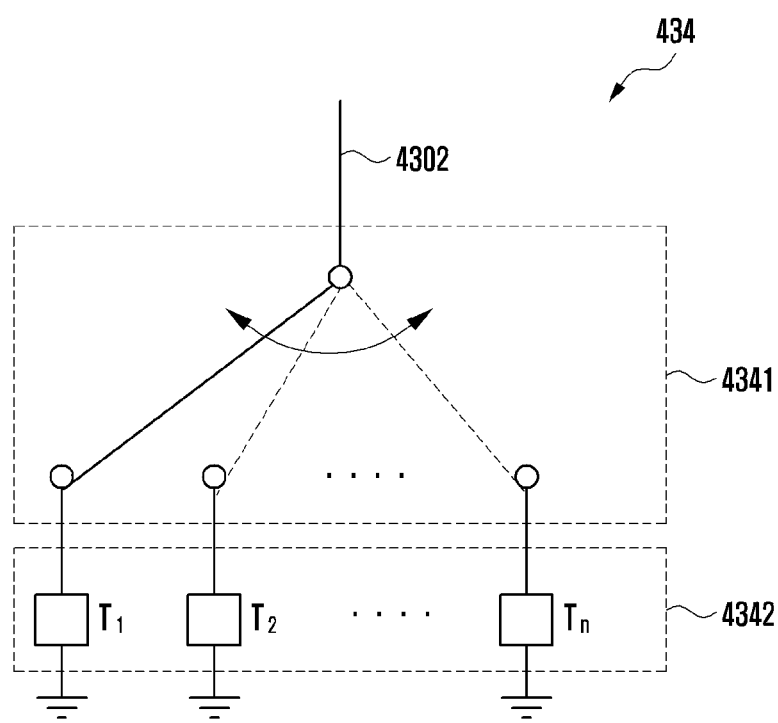
FIG. 7 is a diagram illustrating an example configuration of a variable circuit according to various embodiments.

FIG. 7 is a diagram illustrating an example configuration of a variable circuit 434 according to various embodiments.

Referring to FIG. 7, the variable circuit 434 may include at least one switch 4341 and at least one lumped element 4342 (e.g., T1, T2 . . . , and Tn) selectively connected to the second electrical path 4302 by the at least one switch 4341. According to an embodiment, the at least one switch 4341 may be configured to connect a specific lumped element 4342 and the second electrical path 4302 according to control of a processor (e.g., the processor 490 of FIG. 5). According to an embodiment, the at least one switch 4341 may include a micro-electro mechanical system (MEMS) switch. According to an embodiment, the MEMS switch is configured to perform a mechanical switching operation by a metal plate therein, and thus has a complete turn on/off property, thereby not affecting a change in radiation characteristics of an antenna. For example, as the Coff properties of a capacitor, which can occur when the MEMS switch is off, is lowered, the radiation deterioration of an antenna can be reduced. According to an embodiment, the at least one switch 4341 may include a switch including a single-pole single-throw (SPST), a single-pole double-throw (SPDT), or three or more throws.

Figure 8:
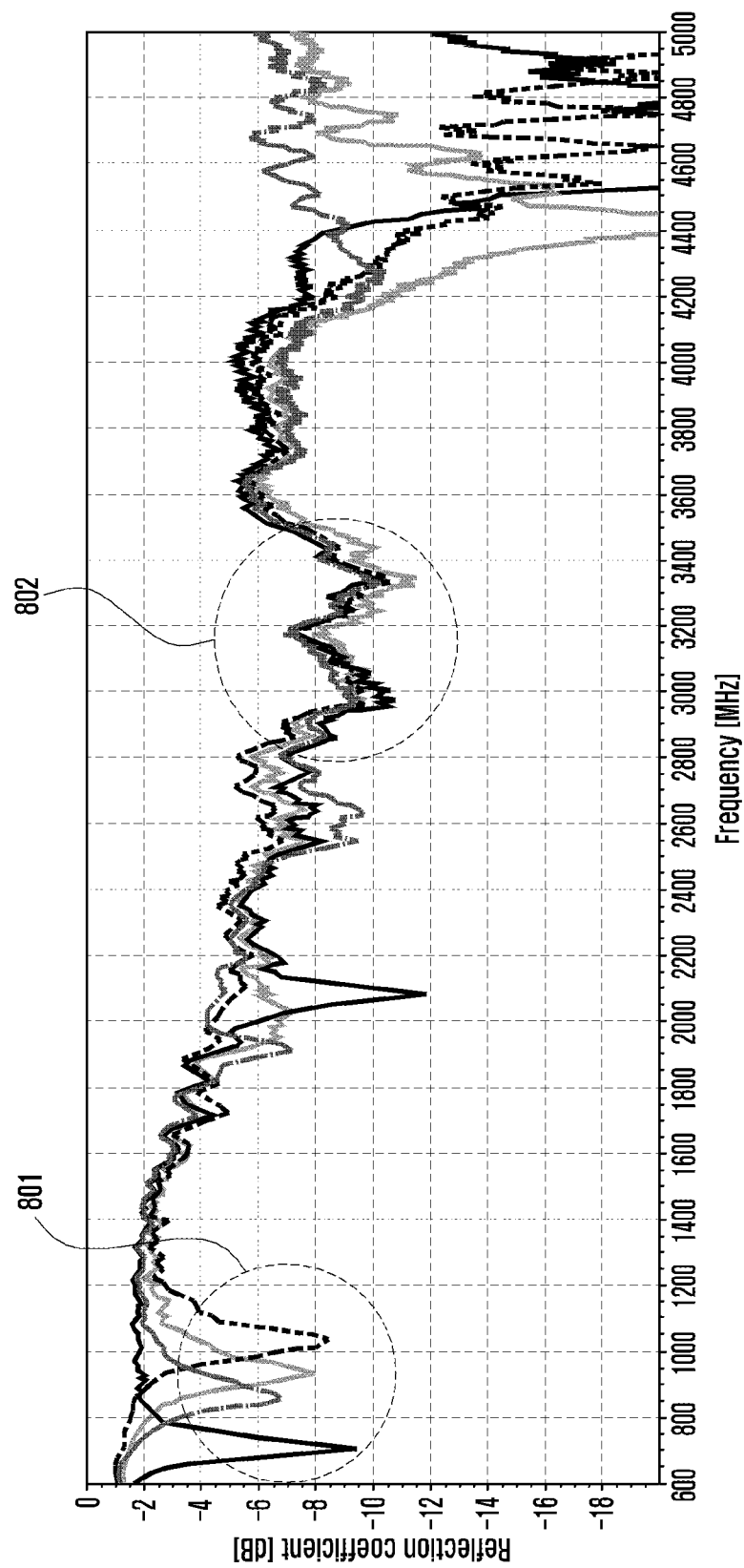
FIG. 8 is a graph comparing frequency changes according to switching of a variable circuit according to various embodiments.

FIG. 8 is a graph comparing frequency changes according to switching of a variable circuit 434 according to various embodiments.

Referring to FIG. 8, in the case of the conductive portion 4211 indirectly fed to the wireless communication circuit 432 through the capacitor 433 and used as an antenna radiator, it may be known that an operating frequency is shifted in the first frequency band (e.g., a low band) according to selection of the lumped elements 4342 through a switching operation of the variable circuit 434 (area 801). In addition, although the operating frequency is shifted in the first frequency band through control of the variable circuit 434, it may be known that the second frequency band (e.g., a high band) does not substantially change (area 802). For example, although the operating frequency is shifted in the first frequency band through the control of the variable circuit 434, the operating frequency may not change in the second frequency band (e.g., a high band). This may refer, for example, to the operating frequency and radiation efficiency of the second frequency band being stably maintained although the operating frequency of the first frequency band is shifted through the variable circuit 434.

Figure 9:
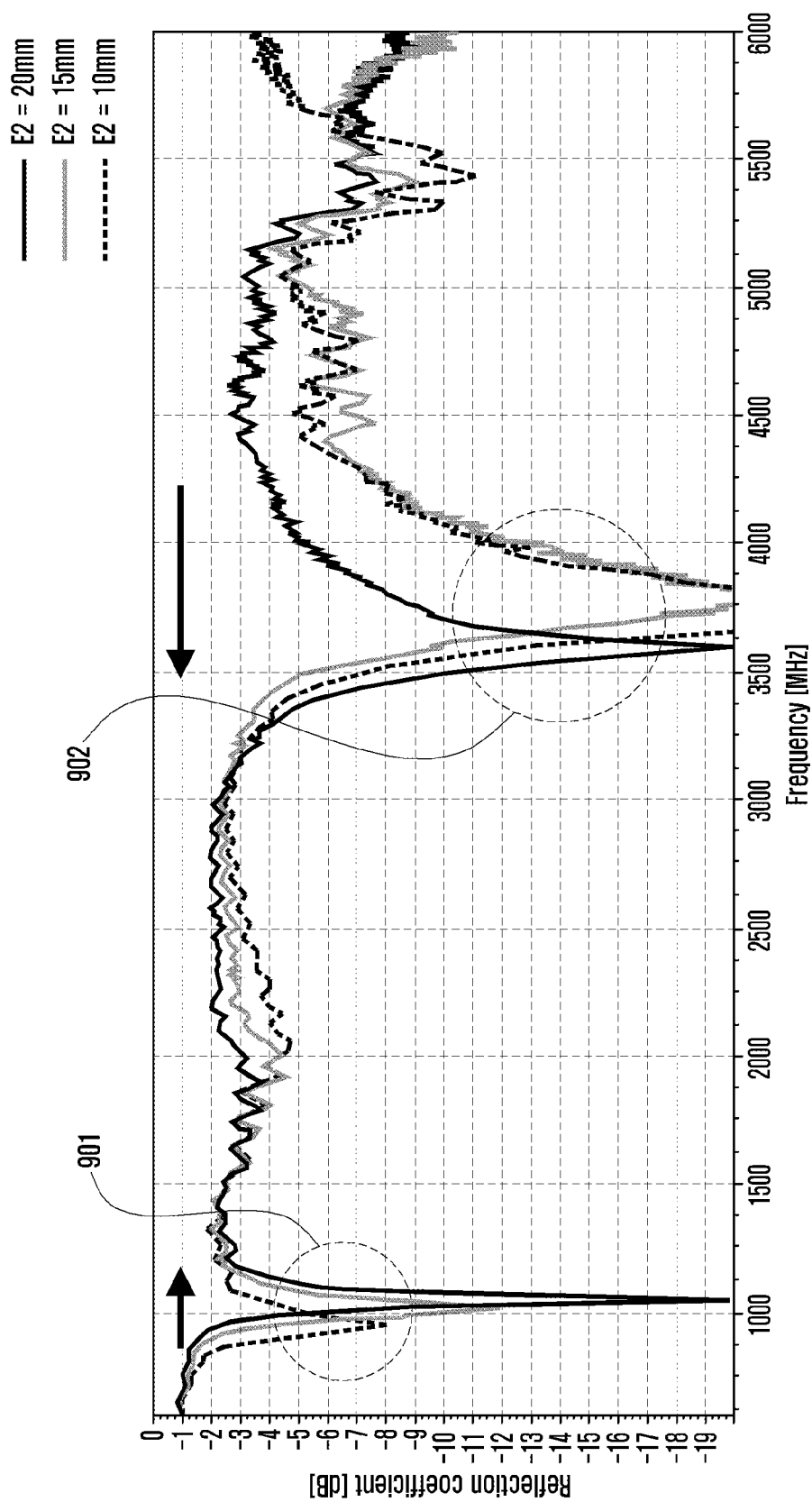
FIG. 9 is a graph comparing changes of a frequency band according to a change in distance between a first point and a second point according to various embodiments.

FIG. 9 is a graph comparing changes of a frequency band according to a change in distance between a first point and a second point according to various embodiments.

FIG. 9 is a graph comparing changes of a frequency band of the conductive portion 4211 according to a change in the second electrical length E2 from a first point L1 to a second point L2 of FIG. 5. In the first frequency band (a low band), it may be known that an operating frequency moves to a higher frequency band as the second electrical length E2 becomes shorter (area 901), and in the second frequency band (e.g., a high band), it may be known that the operating frequency moves to a lower frequency band as the second electrical length E2 becomes shorter (area 902). Therefore, the operating frequency in the second frequency band may be determined by adjusting the second electrical length E2 of the conductive portion 4211, and then the operating frequency in the first frequency band may be set without substantial change in the second frequency band through the variable circuit 434. Accordingly, it may be possible to efficiently design a multi-band antenna.

Figure 10:
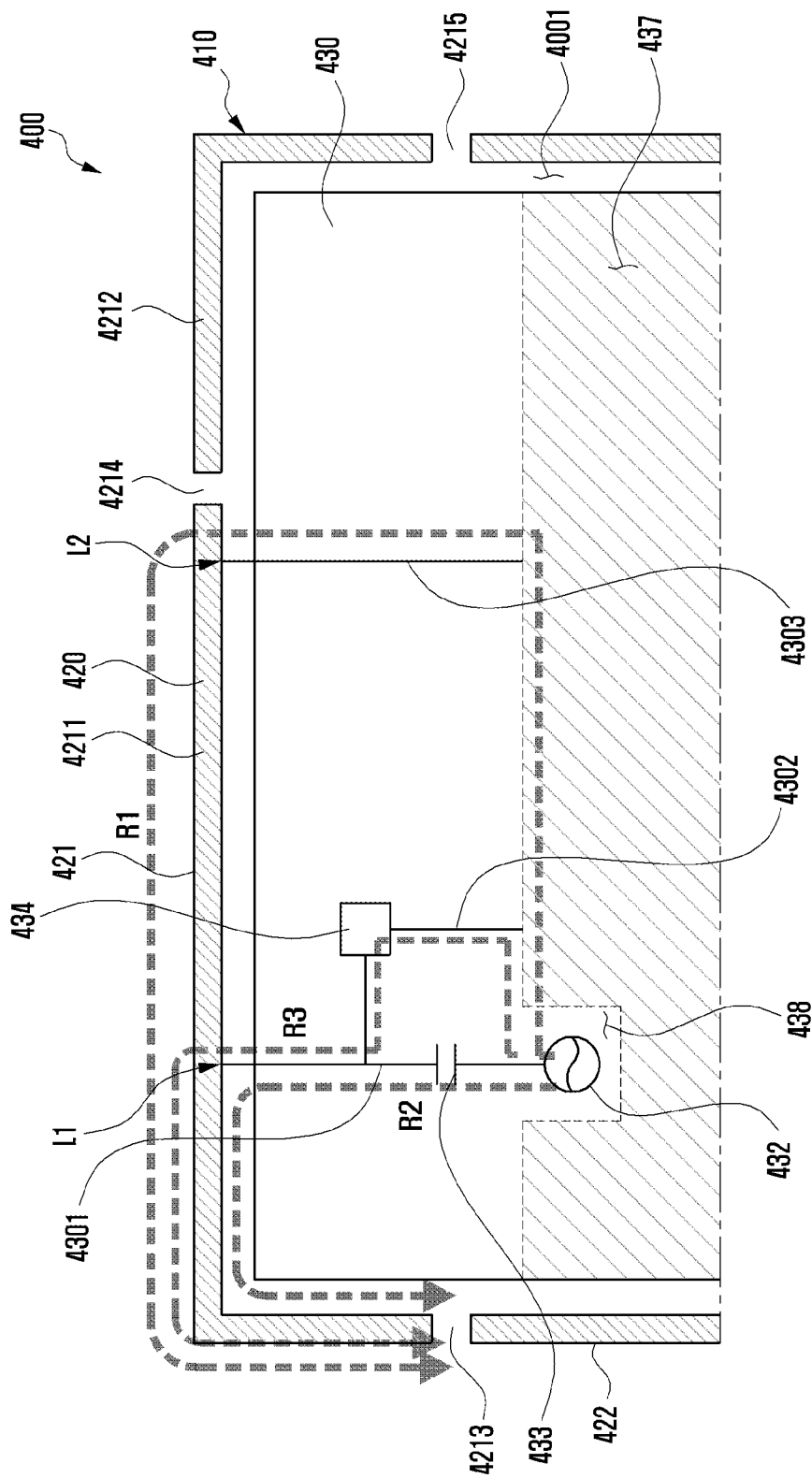
FIG. 10 is a diagram illustrating a partial view of an electronic apparatus including a radiating path of an antenna according to various embodiments.

FIG. 10 is a diagram illustrating a partial view of an electronic apparatus including a radiating path of an antenna according to various embodiments.

In describing the electronic apparatus 400 of FIG. 10, elements substantially the same as those of the electronic apparatus 400 of FIG. 6 are given the same reference numerals as FIG. 6, and detailed descriptions thereof may be omitted.

Referring to FIG. 10, the variable circuit 434 may be branched from the first electrical path 4301 between the capacitor 433 and the first point L1. In this case, the wireless communication circuit 432 may be configured to transmit and/or receive a wireless signal in a first frequency band (e.g., a low band) through the first radiating path R1 through the ground area 437, the third electrical path 4303, and a part (e.g., the portion from the second point L2 to the first non-conductive portion 4213) of the first conductive portion 4211 and a third radiating path R3, which is connected in parallel with the third electrical path 4303, through the ground area 437, the second electrical path 4302, and a part (e.g., the portion from the first point L1 to the first non-conductive portion 4213) of the first conductive portion 4211, by a structure in which the first conductive portion 4211 is fed through the capacitor 433. For example, when the first conductive portion 4211 is fed through the capacitor 433, the wireless communication circuit 432 may be configured to be similar to indirect feeding.

According to various embodiments, the wireless communication circuit 432 may be configured to shift the resonant frequency of the first frequency band through control of the variable circuit 434 by a processor (e.g., the processor 490 of FIG. 5). In this case, the second frequency band through the second radiating path R2, which is fed through the capacitor 433, may not be substantially changed, and thus degradation of antenna radiation performance can be prevented and/or reduced. According to an embodiment, the wireless communication circuit 432 may be configured to shift the resonant frequency of the first frequency band in a second variable frequency range through control of the variable circuit 434 by a processor (e.g., the processor 490 of FIG. 5). According to an embodiment, the second variable frequency range may include a frequency range of 100 Mhz-3000 Mhz. For example, the variable circuit 434 may affect a band swing of moving into another frequency band (e.g., another first frequency) adjacent to an operating frequency band (e.g., the first frequency band) of an antenna through control of a processor (e.g., the processor 490 of FIG. 5). As an embodiment, the variable circuit 434 may also affect a band swing of moving another frequency band (e.g., another first frequency) adjacent to an operating frequency band (e.g., the first frequency band) of an antenna through control of the wireless communication circuit 432.

Figure 11:
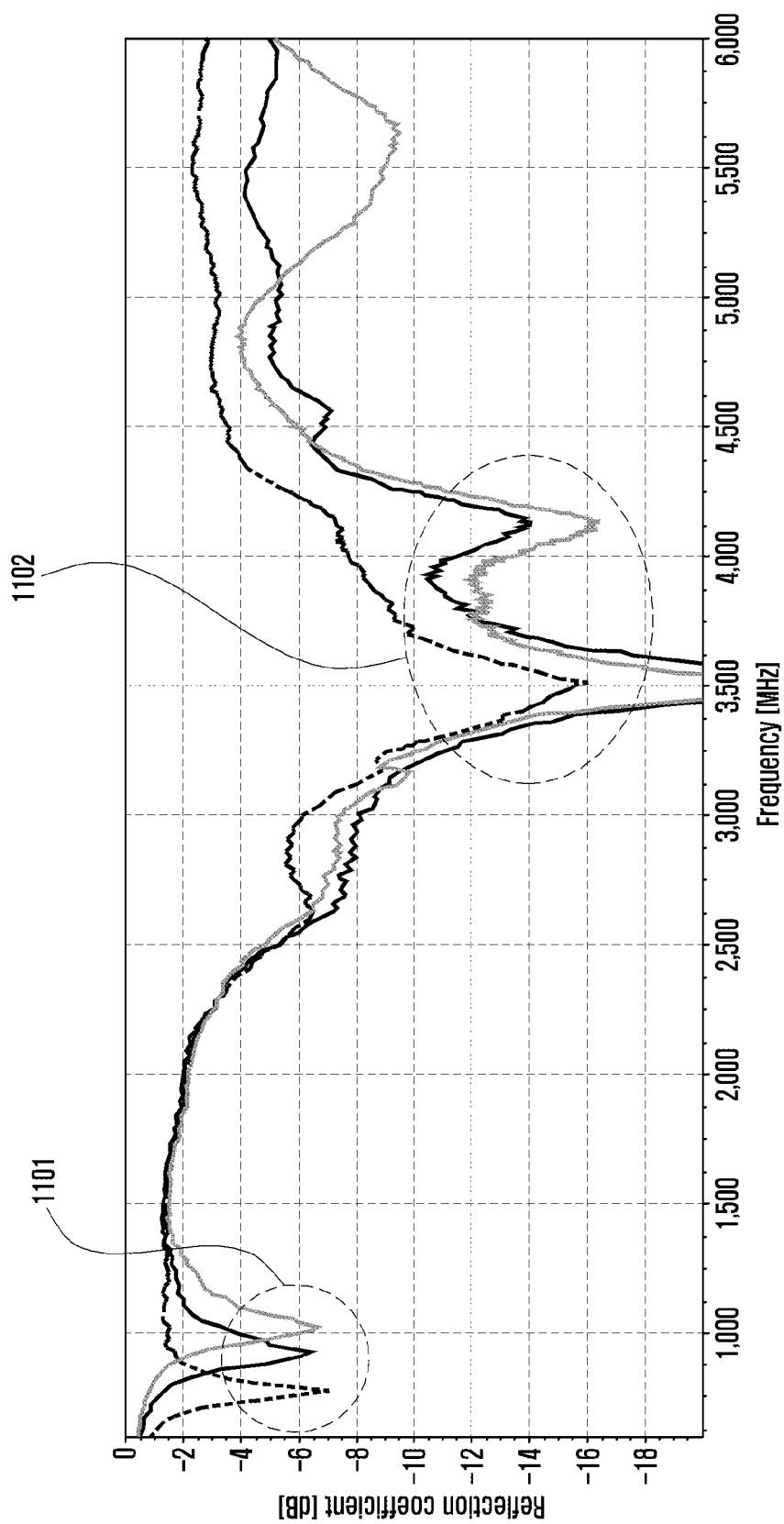
FIG. 11 is a graph comparing a reflection loss and a frequency change according to switching of a variable circuit according to various embodiments

FIG. 11 is a graph comparing a reflection loss and a frequency change according to switching of a variable circuit according to various embodiments.

Referring to FIG. 11, in the case of the first conductive portion 4211 indirectly fed to the wireless communication circuit 432 through the capacitor 433 and used as an antenna, it may be known that an operating frequency is shifted in the first frequency band (e.g., a low band) according to selection of the lumped elements 4342 through a switching operation of the variable circuit 434 (area 1101). In addition, although the operating frequency is shifted in the first frequency band through control of the variable circuit 434, it may be known that the second frequency band (e.g., a high band) does not substantially change (area 1102). For example, this may refer, for example, to the operating frequency and radiation efficiency of the second frequency band being stably maintained although the operating frequency of the first frequency band is shifted through the variable circuit 434.

Figure 12A:
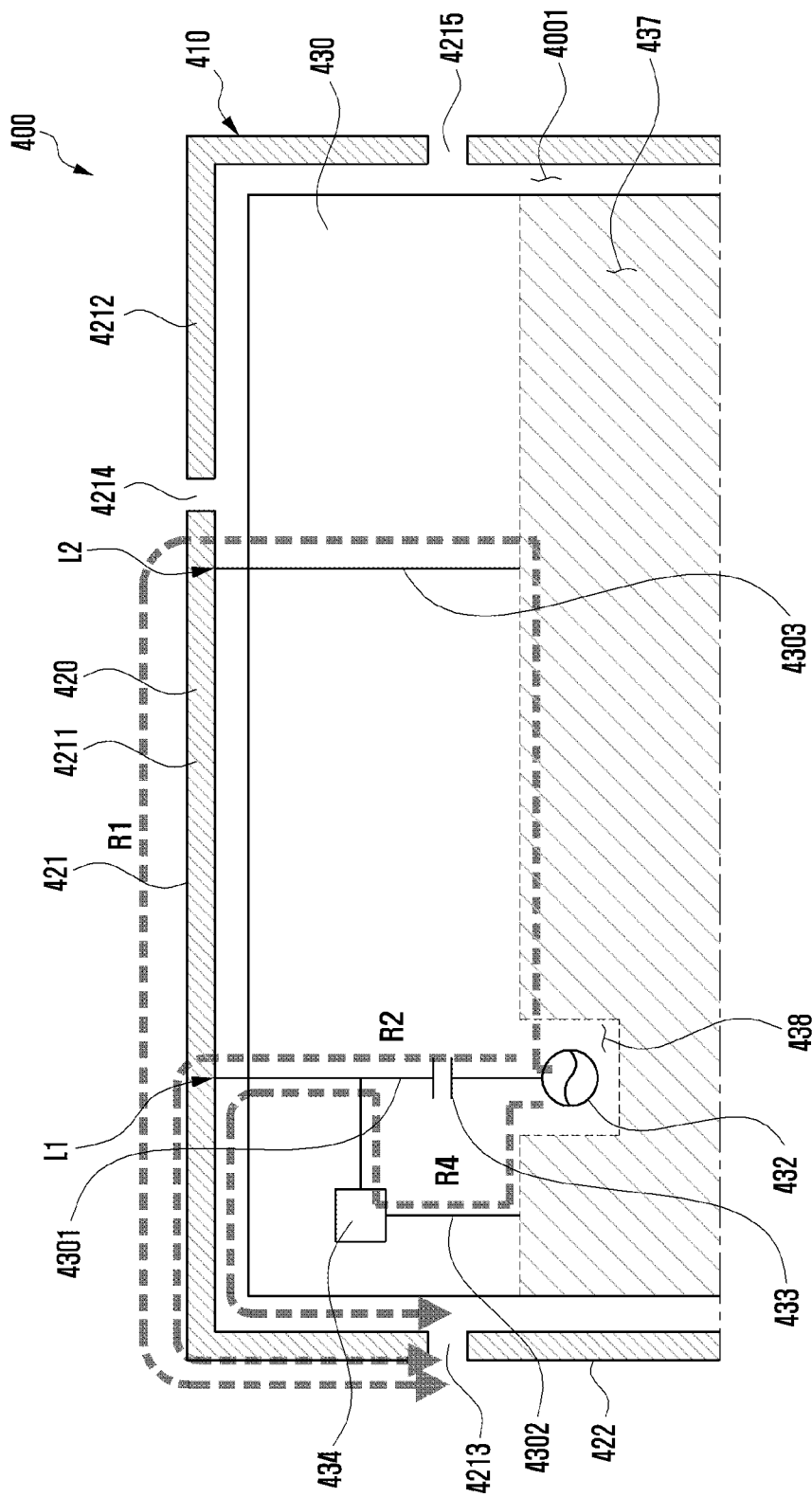
FIGS. 12A, 12B and FIG. 12C are diagrams illustrating partial views of an electronic apparatus including a radiating path of an antenna according to various embodiments.
Figure 12B:
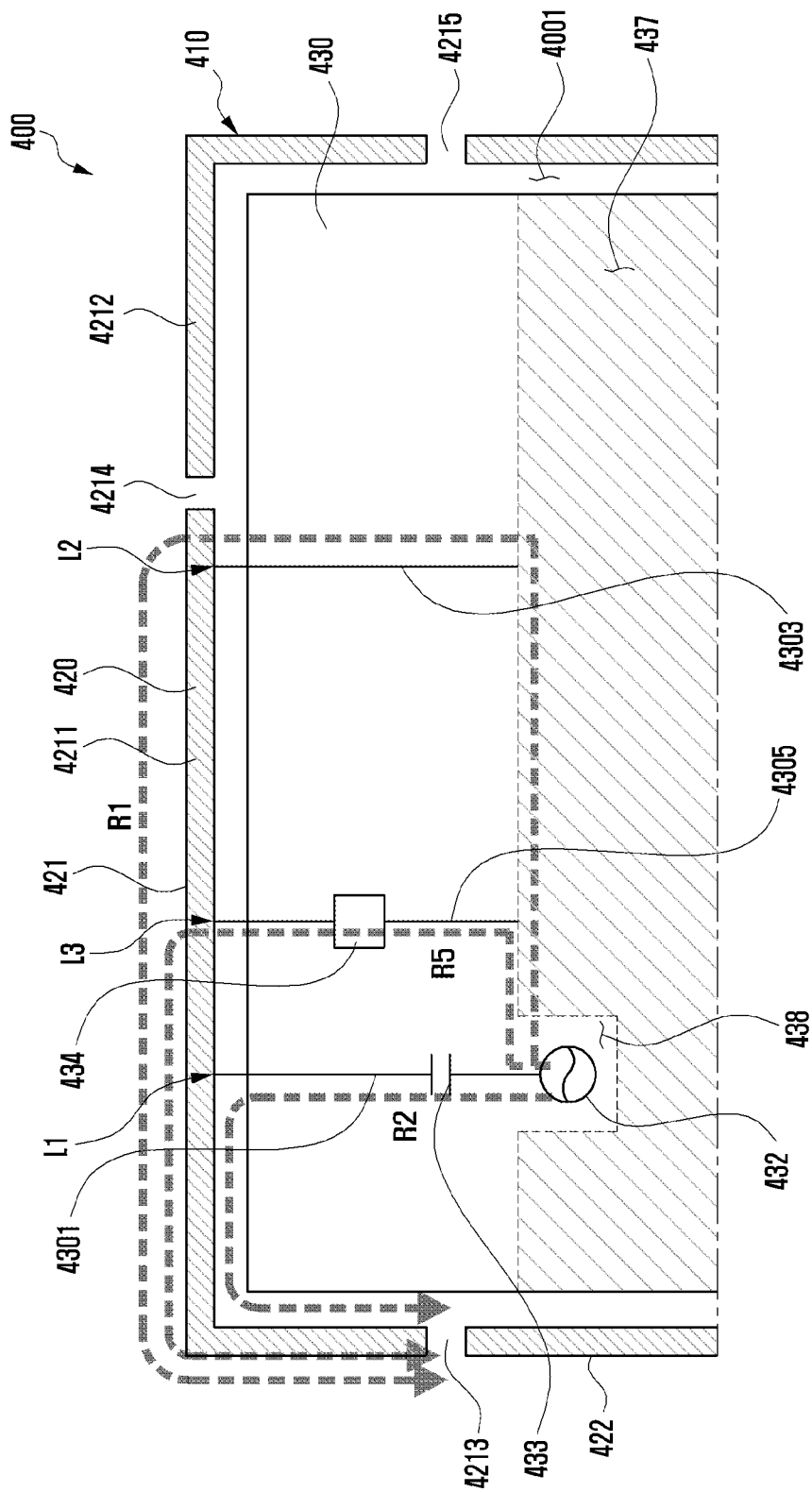
Figure 12C:
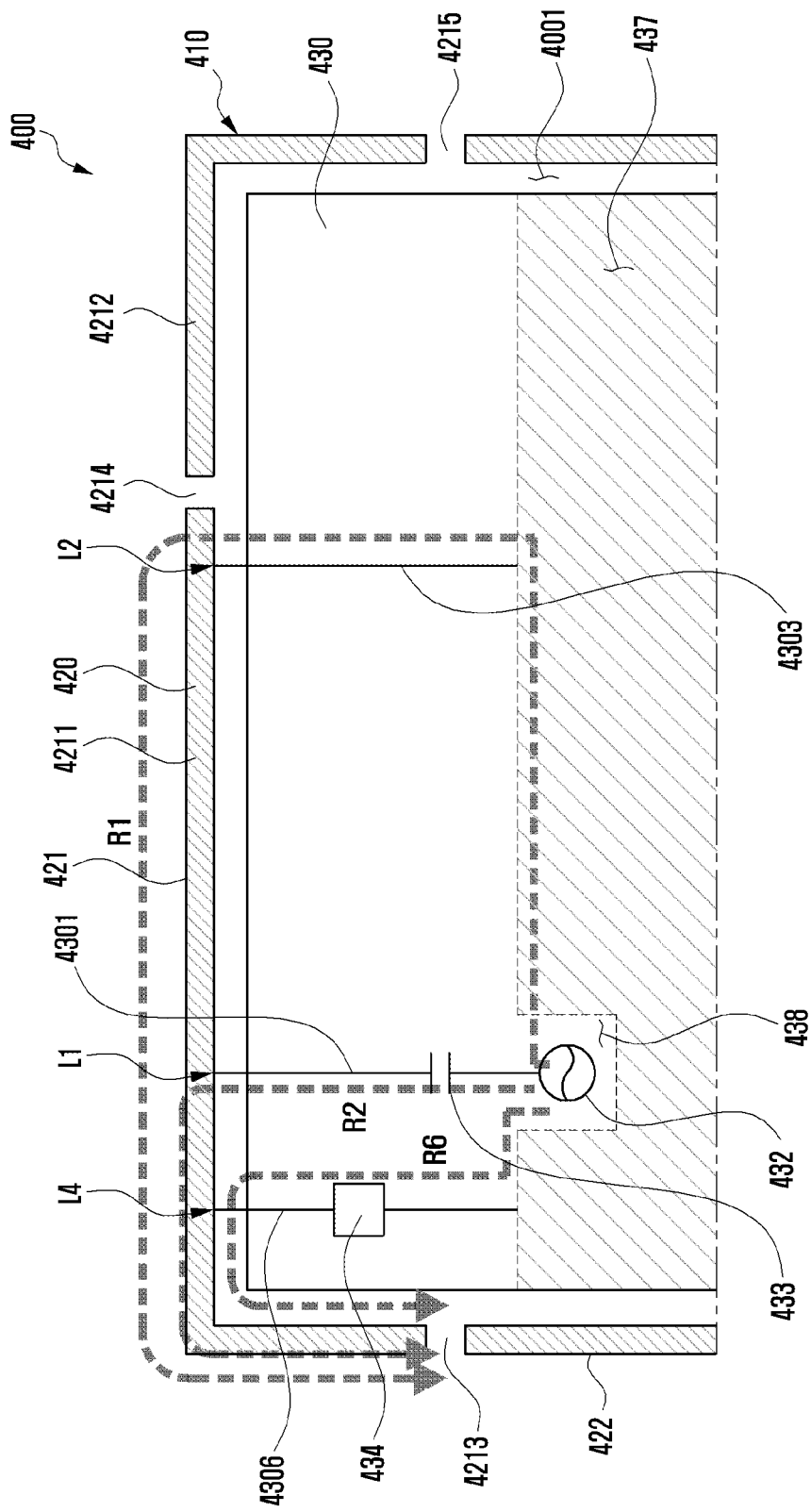

FIGS. 12A, 12B and FIG. 12C (which may be referred to as FIGS. 12A to 12C) are diagrams illustrating partial views of an electronic apparatus including a radiating path of an antenna according to various embodiments.

In describing an electronic apparatus 400 of FIG. 12A to FIG. 12C, elements substantially the same as those of the electronic apparatus 400 of FIG. 10 are given the same reference numerals as FIG. 10, and detailed descriptions thereof may be omitted.

Referring to FIG. 12A, the variable circuit 434 may be branched from the first electrical path 4301 between the capacitor 433 and the first point L1. According to an embodiment, the second electrical path 4302 may be branched to be disposed between the first electrical path 4301 and the second surface 422. In this case, the wireless communication circuit 432 may be configured to transmit and/or receive a wireless signal in a first frequency band (e.g., a low band) through the first radiating path R1 through the ground area 437, the third electrical path 4303, and a part (e.g., the portion from the second point L2 to the first non-conductive portion 4213) of the first conductive portion 4211 and a fourth radiating path R4, which is connected in parallel with the third electrical path 4303, through the ground area 437, the second electrical path 4302, and a part (e.g., the portion from the first point (L1) to the first non-conductive portion 4213) of the first conductive portion 4211, by a structure in which the conductive portion 4211 is fed through the capacitor 433.

Referring to FIG. 12B, the variable circuit 434 may be disposed in a fifth conductive path 4305 configured to electrically connect from a third point L3 positioned between the first point L1 and the second point L2 of the first conductive portion 4211, to the ground area 437 of the printed circuit board 430. In this case, the wireless communication circuit 432 may be configured to transmit and/or receive a wireless signal in a first frequency band (e.g., a low band) through the first radiating path R1 through the ground area 437, the third electrical path 4303, and a part (e.g., the portion from the second point L2 to the first non-conductive portion 4213) of the first conductive portion 4211 and a fifth radiating path R5, which is connected in parallel with the third electrical path 4303, through the ground area 437, the fifth electrical path 4305, and a part (e.g., the portion from the third point L3 to the first non-conductive portion 4213) of the first conductive portion 4211, by a structure in which the conductive portion 4211 is fed through the capacitor 433.

Referring to FIG. 12C, the variable circuit 434 may be disposed in a sixth conductive path 4305 configured to electrically connect from a fourth point L4 positioned between the first point L1 of the first conductive portion 4211 and the first non-conductive portion 4213, to the ground area 437 of the printed circuit board 430. In this case, the wireless communication circuit 432 may be configured to transmit and/or receive a wireless signal in a first frequency band (e.g., a low band) through the first radiating path R1 through the ground area 437, the third electrical path 4303, and a part (e.g., the portion from the second point L2 to the first non-conductive portion 4213) of the conductive portion 4211 and a sixth radiating path R6, which is connected in parallel with the third electrical path 4303, through the ground area 437, the sixth electrical path 4306, and a part (e.g., the portion from the fourth point L4 to the first non-conductive portion 4213) of the first conductive portion 4211, by a structure in which the first conductive portion 4211 is fed through the capacitor 433.

Figure 13:
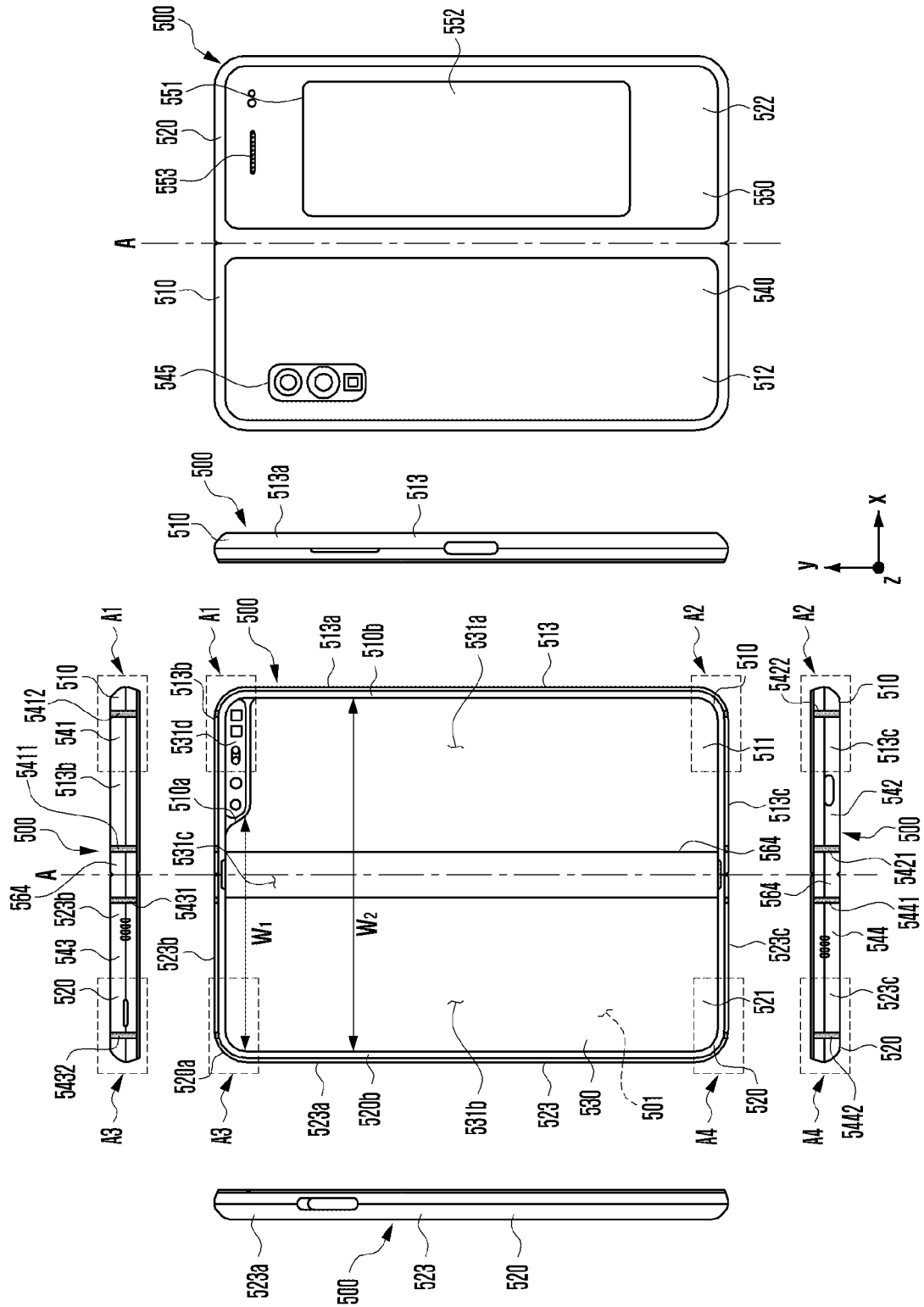
FIG. 13 is a diagram illustrating a foldable electronic apparatus including an antenna according to various embodiments.

FIG. 13 is a diagram illustrating an example foldable electronic apparatus including an antenna according to various embodiments.

Referring to FIG. 13, an electronic apparatus 500 may include a pair of housings 510 and 520 (e.g., a foldable housing) rotatably coupled by means of a hinge module 564 to be foldable with respect to each other, and a display 530 (e.g., a flexible display or a foldable display) disposed in a space formed by the one pair of housings 510 and 520. In the disclosure, a surface, on which the display 530 is disposed, may be defined as the front surface of the electronic apparatus 500, and a surface opposite to the front surface may be defined as the rear surface of the electronic apparatus 500. In addition, a surface, which is configured to surround a space between the front surface and the rear surface, may be defined as the side surface of the electronic apparatus 500.

In an embodiment, the one pair of housings 510 and 520 may include a first housing 510 including a sensor area 531d, a second housing 520, a first rear cover 540, and a second rear cover 550. The one pair of housings 510 and 520 of the electronic apparatus 500 may not be limited to the shape and the combination illustrated in FIG. 10, and may be implemented by a combination and/or coupling of other shapes or components. For example, in an embodiment, the first housing 510 and the first rear cover 540 may be integrally formed, and the second housing 520 and the second rear cover 550 may be integrally formed.

According to an embodiment, the first housing 510 and the second housing 520 may be arranged at both sides with reference to a folding axis (the axis A), and may have an overall symmetrical shape with respect to the folding axis (the axis A). According to an embodiment, the first housing 510 and the second housing 520 may have different angles formed by each other or different distances from each other, depending on whether the state of the electronic apparatus 500 is an unfolded state (a flat state), a folded state (a folding state), or an intermediate state. According to an embodiment, differently from the second housing 520, the first housing 510 may additionally include a sensor area 531d in which various sensors are arranged. However, in an area other than the sensor area 531d, the first housing and the second housing may have a mutually symmetrical shape in other areas. As an embodiment, the sensor arrangement area 531d may be additionally provided in or may be replaced with at least partial area of the second housing 520.

In an embodiment, in an unfolded state of the electronic apparatus 500, the first housing 510 may include a first surface 511 connected to the hinge module 564 and disposed to face the front surface of the electronic apparatus 500, a second surface 512 configured to face a direction opposite to the first surface 511, and a first side member 513 configured to surround at least a part of a space between the first surface 511 and the second surface 512. In an embodiment, the first side member 513 may include a first side surface 513a disposed parallel to the folding axis (the axis A), a second side surface 513b configured to extend from one end of the first side surface 513a in a direction perpendicular to the folding axis, and a third side surface 513c configured to extend from the other end of the first side surface 513a in a direction which is perpendicular to the folding axis (the axis A) and parallel to the second side surface 513b.

In an embodiment, in an unfolded state of the electronic apparatus 500, the second housing 520 may include a third surface 521 connected to the hinge module and disposed to face the front surface of the electronic apparatus 500, a fourth surface 522 configured to face a direction opposite to the third surface 521, and a second side member 523 configured to surround at least a part of a space between the third surface 521 and the fourth surface 522. In an embodiment, the second side member 523 may include a fourth side surface 523a disposed parallel to the folding axis (the axis A), a fifth side surface 523b configured to extend from one end of the fourth side surface 523a in a direction perpendicular to the folding axis (the axis A), and a sixth side surface 523c configured to extend from the other end of the fourth side surface 523a in a direction which is perpendicular to the folding axis (the axis A) and parallel to the fifth side surface 523b. In an embodiment, the first surface 511 may be configured to face the third surface 521 in a folded state.

In an embodiment, the electronic apparatus 500 may include a recess 501 formed to accommodate the display 530 by the structural coupling of the first housing 510 and the second housing 520. The recess 501 may have substantially the same size as the display 530. In an embodiment, due to the sensor area 531d, the recess 501 may have at least two widths different from each other in a direction perpendicular to the folding axis (the axis A). For example, the recess 501 may have a first width W1 between a first portion 510a of the first housing 510, which is formed at the edge of the sensor area 531d, and a second portion 520a of the second housing 520, which is parallel to the folding axis (the axis A), and a second width W2 formed by a third portion 510b of the first housing 510, which does not correspond to the sensor area 513d and is parallel to the folding axis (the axis A), and a fourth portion 520b of the second housing 510. In this case, the second width W2 may be formed to be longer than the first width W1. For example, the recess 501 is formed to have the first width W1 formed from the first portion 510a of the first housing 510 to the second portion 520a of the second housing 520, which have a mutually asymmetric shape, and the second width W2 formed from the third portion 510b of the first housing 510 to the fourth portion 520b of the second housing 520, which have a mutually symmetrical shape. In an embodiment, the first portion 510a and the third portion 510b of the first housing 510 may be formed to have distances different from the folding axis (the axis A). The width of the recess 501 may not be limited to the illustrated embodiment. In various embodiments, the recess 501 may have two or more widths different from each other due to the shape of the sensor area 531d or the portions of the first housing 510 and the second housing 520, which have an asymmetric shape. In an embodiment, at least a part of the first housing 510 and the second housing 520 may be formed of a metal material or non-metal material having the rigidity of a size selected in order to support the display 530.

In an embodiment, the sensor area 531d may be formed to have a predetermined area adjacent to a side corner of the first housing 510. However, the arrangement, shape, or size of the sensor area 531d may not be limited to the illustrated embodiment. For example, in an embodiment, the sensor area 531d may be provided at another corner or an area between the upper corner and the lower corner of the first housing 510. As an embodiment, the sensor area 531d may be disposed in at least a partial area of the second housing 520. As an embodiment, the sensor area 531d may be disposed to extend from the first housing 510 and the second housing 520. In an embodiment, the electronic apparatus 500 may include components which are arranged to be exposed on the front surface of the electronic apparatus 500 through the sensor area 531d or through one or more openings provided through the sensor area 531d so as to perform various functions. In various embodiments, for example, the components may include at least one of a front camera device, a receiver, a proximity sensor, an illuminance sensor, an iris recognition sensor, an ultrasonic sensor, and an indicator.

In an embodiment, a first rear cover 140 may be disposed on a second surface 112 of the first housing 510 and may have a substantially rectangular edge (periphery). In an embodiment, at least a part of the edge thereof may be configured to be surrounded by the first housing 510. Similarly thereto, a second rear cover 150 may be disposed on a fourth surface 122 of the second housing 520, and at least a part of the edge thereof may be configured to be surrounded by the second housing 520.

In the illustrated embodiment, the first rear cover 540 and the second rear cover 550 may have a substantially symmetrical shape with reference to the folding axis (the axis A). As an embodiment, the shapes of the first rear cover 540 and the second rear cover 550 may be different and various. As an embodiment, the first rear cover 540 may be integrally formed with the first housing 510, and the second rear cover 550 may be integrally formed with the second housing 520.

In an embodiment, the first rear cover 540, the second rear cover 550, the first housing 510, and the second housing 520 may be configured to provide a space, in which various components (e.g., a printed circuit board, an antenna module, a sensor module, or a battery) of the electronic device 500 can be arranged, through a structure formed by being coupled to one another. In an embodiment, one or more components may be disposed or visually exposed on the rear surface of the electronic apparatus 500. For example, one or more components or sensors may be visually exposed through the first rear surface area 545 of the first rear cover 540. In various embodiments, the sensors may include a proximity sensor, a rear camera device, and/or a flash. In an embodiment, at least a part of a sub-display 552 may be visually exposed through a second rear area 551 of the second rear cover 550. In an embodiment, the electronic apparatus 500 may include a speaker module 553 disposed through at least a partial area of the second rear cover 550.

The display 530 may be disposed in a space formed by the one pair of housings 510 and 520. For example, the display 500 may be seated in the recess 501 formed by the one pair of housings 510 and 520, and may be disposed to substantially occupy the majority of the front surface of the electronic apparatus 500. Accordingly, the front surface of the electronic apparatus 500 may include the display 530, and a partial area (e.g., an edge area) of the first housing 510 and a partial area (e.g., an edge area) of the second housing 520, which are adjacent to the display 530. In an embodiment, the rear surface of the electronic apparatus 500 may include the first rear cover 540, a partial area (e.g., an edge area) of the first housing 510, which is adjacent to the first rear cover 540, the second rear cover 550, and a partial area (e.g., an edge area) of the second housing 520, which is adjacent to the second rear cover 550.

In an embodiment, the display 530 may refer, for example, to a display, at least a partial area of which can be transformed into a flat surface or curved surface. In an embodiment, the display 530 may include a folding area 531c, a first area 531a disposed at one side (e.g., the right area of the folding area 531c) with reference to the folding area 531c, and a second area 531b disposed at the other side (e.g., the left area of the folding area 531c) thereof. For example, the first area 531a may be disposed on the first surface 511 of the first housing 510, and the second area 531b may be disposed on the third surface 521 of the second housing 520. In an embodiment, the division of the area of the display 530 may be merely an example, and the display 530 may be divided into multiple (for example, four or more, or two) areas according to a structure or a function thereof. For example, in the embodiment illustrated in FIG. 10, the area of the display 530 may be divided by the folding area 531c or the folding axis (the axis A) extending parallel to the y-axis. However, in an embodiment, the area of the display 530 may be divided with reference to another folding area (e.g., a folding area parallel to the x-axis) or another folding axis (e.g., a folding axis parallel to the x-axis). The division of the area of the display described above may be merely a physical division by the one pair of housings 510 and 520 and a hinge module 564, and substantially, the display 530 may be displayed as one entire screen through the one pair of housings 510 and 520 and the hinge module 564. In an embodiment, the first area 531a and the second area 531b may have an overall symmetrical shape with reference to the folding area 531c. However, differently from the second area 531b, the first area 531a may include a notch area which is cut according to the presence of the sensor area 531d, and in an area other than the sensor area 531d, may have a symmetrical shape with the second area 531b. For example, the first area 531a and the second area 531b may include portions having a shape symmetric to each other and portions having a shape asymmetric to each other.

According to various embodiments, the first housing 510 may include a first conductive portion 541 which is disposed to be electrically insulated by one pair of non-conductive portions 5411 and 5412 spaced apart from each other on the second side surface 513b of the first conductive side member 513. According to an embodiment, the first housing 520 may include a second conductive portion 542 which is disposed to be electrically insulated by one pair of non-conductive portions 5421 and 5422 spaced apart from each other on the third side surface 513c of the first conductive side member 513. According to an embodiment, the second housing 520 may include a third conductive portion 543 which is disposed to be electrically insulated by one pair of non-conductive portions 5431 and 5432 spaced apart from each other on the fifth side surface 523b of the second conductive side member 523. According to an embodiment, the second housing 520 may include a fourth conductive portion 544 which is disposed to be electrically insulated by one pair of non-conductive portions 5441 and 5442 spaced apart from each other on the sixth side surface 523c of the second conductive side member 523.

According to various embodiments, the electronic apparatus 500 may be configured to have an indirect feeding structure with a wireless communication circuit (e.g., the wireless communication circuit 432 of FIG. 5) by a capacitor (e.g., the capacitor 433 of FIG. 5) through at least one of the first conductive portion 541, the second conductive portion 542, the third conductive portion 543, or the fourth conductive portion 544. In this case, when the hinge module 564 for connecting the first housing 510 and the second housing 520 is formed of a conductor, radiation performance thereof may be degraded. Therefore, an indirect feeding structure may be configured through the corner areas (area A1, area A2, area A3, area A4) of each of the housings, which are spaced maximally apart from the hinge module 564.

According to various example embodiments, an electronic apparatus (e.g., the electronic apparatus 400 of FIG. 5) may include: a housing (e.g., the housing 410 of FIG. 5) including at least one conductive portion (e.g., the conductive portion 4211 of FIG. 5) through which at least one non-conductive portion (e.g., the non-conductive portions 4213 and 4214 of FIG. 5) is disposed, a substrate (e.g., the printed circuit board 430 of FIG. 5) disposed in an inner space (e.g., the inner space 4001 of FIG. 5) of the housing and including a ground (e.g., the ground 437 of FIG. 5), a wireless communication circuit (e.g., the wireless communication circuit 432 of FIG. 5) disposed on the substrate and indirectly electrically connected (capacitively coupled) to a first point (e.g., the first point L1 of FIG. 5) of the conductive portion positioned at a first electrical distance (e.g., the first electrical distance E1 of FIG. 5) from the at least one non-conductive portion through a first electrical path (e.g., the first electrical path 4301 of FIG. 5), and a variable circuit (e.g., the variable circuit 434 of FIG. 5) branched from the first electrical path and disposed in a second electrical path (e.g., the second electrical path 4302 of FIG. 5) connected to the ground, wherein the conductive portion may be connected to the ground through a third electrical path (e.g., third electrical path 4303 of FIG. 5) at a second point (e.g., second point L2 of FIG. 5) further than the first point from the first non-conductive portion, wherein the first electrical distance may be shorter than a second electrical distance (e.g., the second electrical length E2 of FIG. 5) from the first point to the second point.

According to various example embodiments, the variable circuit may include multiple lumped elements (e.g., lumped elements 4342 of FIG. 7) and a switch (e.g., the switch 4341 of FIG. 7) configured to selectively switch each of the multiple lumped elements, wherein the switch may include a micro-electro mechanical system (MEMS) switch.

According to various example embodiments, the conductive portion may be electrically connected to the wireless communication circuit through a capacitor (e.g., the capacitor 433 in FIG. 5) disposed in the first electrical path and having a specified capacitance value.

According to various example embodiments, the capacitor may include a capacitance value in a range of 0.5 PF-1.5 PF.

According to various example embodiments, the second electrical path may be branched between the capacitor and the wireless communication circuit.

According to various example embodiments, a fourth electrical path branched between the capacitor and the second electrical path of the first electrical path and connected to the ground, and at least one passive element (e.g., the passive element 435 for ESD of FIG. 5) for electrostatic discharge (ESD disposed in the fourth electrical path, may be included therein.

According to various example embodiments, the second electrical path may be branched between the first point and the capacitor of the first electrical path.

According to various example embodiments, the second electrical path may be disposed between the first electrical path and the third electrical path.

According to various example embodiments, the printed circuit board may include a first conductive pad (e.g., the first connection part 431 of FIG. 5) connected to the first electrical path, wherein the first conductive pad may be electrically coupled to the conductive portion.

According to various example embodiments, the wireless communication circuit may be configured to transmit and/or receive a wireless signal in a first frequency band and a second frequency band higher than the first frequency band through the conductive portion.

According to various example embodiments, the first frequency band may include a low-band in a range of about 700 MHz-900 MHz.

According to various example embodiments, the second frequency band may include a mid-band in a range of about 1700 MHz-2100 MHz and/or a high-band in a range of about 2300 MHz-2700 MHz.

According to various example embodiments, the first frequency band and the second frequency band may be shifted based on a change in the second electrical length.

According to various example embodiments, the first frequency band may be shifted while the second frequency band is maintained, based on a switching operation of the variable circuit.

According to various example embodiments, the housing (e.g., the housing 210 of FIG. 2A) may include: a front cover (e.g., the front plate 202 of FIG. 2A), a rear cover (e.g., the rear plate 211 of FIG. 2B) configured to face a direction opposite to the front cover, and a conductive side portion (e.g., the side member 420 in FIG. 5) surrounding a space between the front cover and the rear cover, wherein the conductive portion may be disposed to be electrically separated by a first non-conductive portion (e.g., the first non-conductive portion 4213 of FIG. 5) and a second non-conductive portion (e.g., the second non-conductive portion 4214 in FIG. 5) arranged in the conductive side portion to be spaced apart from each other.

According to various example embodiments, in the inner space, a display (e.g., the display 201 in FIG. 2A), disposed to be at least partially visible from the outside through the front cover in the inner space, may be further included therein.

According to various example embodiments, at least one processor (e.g., the processor 490 of FIG. 5), configured to control the variable circuit, such that the wireless communication circuit is configured to transmit and/or receive a wireless signal in a frequency band shifted through the conductive portion, may be included therein.

According to various example embodiments, a housing may include a conductive hinge module comprising a hinge (e.g., the hinge module 564 of FIG. 10), a first housing (e.g., the first housing 510 of FIG. 10) connected to the hinge module and including a first surface (e.g., the first surface 511 of FIG. 10), a second surface (e.g., the second surface 512 in FIG. 10) facing a direction opposite to the first surface, and a first conductive side portion (e.g., the first side member 513 of FIG. 10) surrounding a first space between the first surface and the second surface, a second housing (e.g., the second housing 520 of FIG. 10) connected to the hinge module and including a third surface (e.g., the third surface 521 of FIG. 10), a fourth surface (e.g., the fourth surface 522 of FIG. 10) facing a direction opposite to the third surface, and a second conductive side portion (e.g., the second side member 523 of FIG. 10) surrounding a second space between the third surface and the fourth surface, at least one conductive portion (e.g., the conductive portions 541, 542, 543, and 544 of FIG. 10) through which at least one non-conductive portion (e.g., the non-conductive portions 5411, 5412, 5421, 5422, 5431, 5432, 5441, and 5442 of FIG. 10) is disposed, the at least one non-conductive portion spaced apart from one another in at least one side portion of the first conductive side portion and/or the second conductive side portion, wherein the housing includes a first housing and a second housing configured to be foldable such that in an unfolded state, the first surface and the third surface face a viewing direction, and in a folded state, the second surface and the fourth surface face opposite directions, a display (e.g., the display 530 of FIG. 10), disposed to cross from at least a part of the first surface to at least a part of the third surface through the hinge module, is included therein, a printed circuit board (e.g., the printed circuit board 430 of FIG. 5), disposed in the first space and/or the second space and including a ground (e.g., the ground 437 of FIG. 5), is included therein, a wireless communication circuit (e.g., the wireless communication circuit 432 of FIG. 5) disposed on the substrate and indirectly electrically connected to a first point (e.g., the first point L1 of FIG. 5) of the conductive portion, positioned at a first electrical distance (e.g., the first electrical distance E1 of FIG. 5) from the at least one non-conductive portion through a first electrical path (e.g., the first electrical path 4301 of FIG. 5), is included therein, a variable circuit (e.g., the variable circuit 434 of FIG. 5), branched from the first electrical path and disposed in a second electrical path (e.g., the second electrical path 4302 of FIG. 5) connected to the ground, is included therein, the conductive portion is connected to the ground through a third electrical path (e.g., the third electrical path 4303 of FIG. 5) at a second point (e.g., the second point L2 of FIG. 5), further than the first point from the first non-conductive portion, and the first electrical distance is shorter than a second electrical distance (e.g., the second electrical length E2 of FIG. 5) from the first point to the second point.

According to various example embodiments, the variable circuit may include multiple lumped elements and a switch configured to selectively switch each of the multiple lumped elements, and the switch may include a micro-electro mechanical system (MEMS) switch.

According to various example embodiments, the conductive portion may be electrically connected to the wireless communication circuit through a capacitor which having a specified capacitance value and is disposed in the first electrical path.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic apparatus comprising:
   a housing comprising at least one conductive portion disposed through at least one non-conductive portion;
   a substrate disposed in an inner space of the housing and comprising a ground;
   a wireless communication circuit connected to the substrate by a first wiring line coupled to a first connection pad which is connected to the conductive portion;
   a capacitor having a specified capacitance value connected on the first wiring line between the wireless communication circuit and the first connection pad; and
   a variable circuit disposed on a second wiring line and connected to the ground, the second wiring line being branched from the first wiring line at a point on the first wiring line which is between the wireless communication circuit and the capacitor, wherein
   the conductive portion is connected to the ground through a third wiring line which is connected to the conductive portion at a second connection pad, the second connection pad being further than the first connection pad from the at least one non-conductive portion.

2. The electronic apparatus of claim 1, wherein:
   the variable circuit comprises multiple lumped elements and a switch configured to selectively switch each of the multiple lumped elements, and
   the switch comprises a micro-electro mechanical system (MEMS) switch.

3. The electronic apparatus of claim 1, wherein:
   the capacitor has a capacitance value in a range of 0.5 PF-1.5 PF.

4. The electronic apparatus of claim 1, further comprising:
   a fourth wiring line branched between the capacitor and the second electrical path of the first wiring line and connected to the ground, and at least one passive element for electrostatic discharge (ESD disposed in the fourth wiring line.

5. The electronic apparatus of claim 1, wherein:
the wireless communication circuit is configured to transmit and/or receive a wireless signal in a first frequency band and a second frequency band higher than the first frequency band through the conductive portion.

6. The electronic apparatus of claim 5, wherein:
the first frequency band comprises a low-band having a frequency in a range of 700 MHz-900 MHZ.

7. The electronic apparatus of claim 5, wherein:
the second frequency band comprises a mid-band having a frequency in a range of 1700 MHz-2100 MHz and/or a high-band having a frequency in a range of 2300 MHz-2700 MHZ.

8. The electronic apparatus of claim 5, wherein:
the first frequency band and the second frequency band are shifted based on a change in the second electrical length.

9. The electronic apparatus of claim 5, wherein:
the first frequency band is shifted while the second frequency band is maintained, based on a switching operation of the variable circuit.

10. The electronic apparatus of claim 1, wherein
the housing comprises:
a front cover;
a rear cover facing a direction opposite to the front cover; and
a conductive side portion surrounding a space between the front cover and the rear cover, wherein
the conductive portion is disposed to be electrically separated by a first non-conductive portion and a second non-conductive portion arranged in the conductive side portion to be spaced apart from each other.

11. The electronic apparatus of claim 1, further comprising a display disposed to be at least partially visible from the outside through the front cover in the inner space.

12. An electronic apparatus of claim 1, further comprising at least one processor comprising processor circuitry configured to control the variable circuit, such that the wireless communication circuit is configured to transmit and/or receive a wireless signal in a frequency band shifted through the conductive portion.

13. An electronic apparatus comprising:
a housing comprises:
a conductive hinge module;
a first housing connected to the hinge module and including a first surface, a second surface facing a direction opposite to the first surface, and a first conductive side portion surrounding a first space between the first surface and the second surface;
a second housing connected to the hinge module and including a third surface, a fourth surface facing a direction opposite to the third surface, and a second conductive side portion surrounding a second space between the third surface and the fourth surface; and
at least one conductive portion through which at least one non-conductive portion is disposed, the at least one non-conductive portion spaced apart from one another in at least one side portion of the first conductive side portion and/or the second conductive side portion,
wherein the housing includes a first housing and a second housing configured to be foldable such that in an unfolded state, the first surface and the third surface face a viewing direction, and in a folded state, the second surface and the fourth surface face opposite directions;
a display disposed to cross from at least a part of the first surface to at least a part of the third surface through the hinge module, is included therein;
a printed circuit board disposed in the first space and/or the second space and including a ground;
a wireless communication circuit connected by a first wiring line which is coupled to a first connection pad disposed on the substrate;
a capacitor having a specified capacitance value connected on the first wiring line between the wireless communication circuit and the first connection pad; and
a variable circuit disposed on a second wiring line and connected to the ground, the second wiring line being branched from the first wiring line at a point on the first wiring line which is between the wireless communication circuit and the capacitor;
wherein the at least one conductive portion is connected to the ground through a third wiring at a second connection pad.

14. An electronic apparatus of claim 13, wherein the variable circuit includes multiple lumped elements and a switch configured to selectively switch each of the multiple lumped elements, and the switch may include a microelectro mechanical system (MEMS) switch.

* * * * *